(12) United States Patent
Kumar et al.

(10) Patent No.: US 12,054,589 B2
(45) Date of Patent: Aug. 6, 2024

(54) ISOCYANATE-FUNCTIONAL POLYMER COMPONENTS AND POLYURETHANE ARTICLES FORMED FROM RECYCLED POLYURETHANE ARTICLES AND ASSOCIATED METHODS FOR FORMING SAME

(71) Applicant: BASF SE, Ludwigshafen am Rhein (DE)

(72) Inventors: Rajesh Kumar, Wyandotte, MI (US); Steven Wujcik, Wyandotte, MI (US); Nikolay Lebediniski, Wyandotte, MI (US); Christopher Milantoni, Wyandotte, MI (US)

( * ) Notice: Subject to any disclaimer, the term of this patent is extended or adjusted under 35 U.S.C. 154(b) by 675 days.

(21) Appl. No.: 16/636,092

(22) PCT Filed: Aug. 1, 2018

(86) PCT No.: PCT/EP2018/070840
§ 371 (c)(1),
(2) Date: Feb. 3, 2020

(87) PCT Pub. No.: WO2019/030071
PCT Pub. Date: Feb. 14, 2019

(65) Prior Publication Data
US 2020/0157306 A1  May 21, 2020

Related U.S. Application Data

(60) Provisional application No. 62/541,975, filed on Aug. 7, 2017.

(51) Int. Cl.
| | |
|---|---|
| C08J 11/06 | (2006.01) |
| C08G 18/12 | (2006.01) |
| C08G 18/73 | (2006.01) |
| C08G 18/76 | (2006.01) |
| C08G 18/79 | (2006.01) |

(52) U.S. Cl.
CPC .............. *C08J 11/06* (2013.01); *C08G 18/12* (2013.01); *C08G 18/73* (2013.01); *C08G 18/76* (2013.01); *C08G 18/797* (2013.01); *C08G 2110/0008* (2021.01); *C08G 2110/0025* (2021.01); *C08J 2375/04* (2013.01)

(58) Field of Classification Search
CPC ... B29B 17/00; B29C 67/246; B29K 2075/00; B29K 2105/26; C08G 18/12; C08G 18/40; C08G 18/4072; C08G 18/4833; C08G 18/63; C08G 18/631; C08G 18/6622; C08G 18/73; C08G 18/76; C08G 18/7621; C08G 18/797; C08G 18/82; C08G 2110/0008; C08G 2110/0025; C08G 2110/0083; C08J 11/04; C08J 11/06; C08J 2375/04; Y02P 20/143; Y02W 30/62

See application file for complete search history.

(56) References Cited

U.S. PATENT DOCUMENTS

| | | | |
|---|---|---|---|
| 5,908,894 A | | 6/1999 | Genz et al. |
| 2005/0096399 A1* | | 5/2005 | Villwock ................. C08J 3/122 |
| | | | 521/49 |
| 2013/0237622 A1 | | 9/2013 | Wujcik et al. |

FOREIGN PATENT DOCUMENTS

| | | | | |
|---|---|---|---|---|
| DE | 10 2007 020985 A1 | | 11/2007 | |
| DE | 10 2013 012625 A1 | | 2/2015 | |
| EP | 1072648 A1 | | 1/2001 | |
| JP | 2668137 B2 | * | 10/1997 | |
| WO | WO-9319917 A1 | * | 10/1993 | ............. B29B 13/06 |
| WO | WO-2005042135 A2 | * | 5/2005 | ............. C08J 11/08 |

OTHER PUBLICATIONS

International Search Report and Written Opinion from counterpart International Application No. PCT/EP2018/070840 dated Nov. 16, 2018.

* cited by examiner

*Primary Examiner* — John M Cooney

(57) ABSTRACT

A method of forming an isocyanate-functional polymer component includes forming a first mixture by mixing a recycled polyurethane article and a first isocyanate component having isocyanate-functional groups. The first mixture is heated to a temperature sufficient to transform the recycled polyurethane article from a solid form to a liquid form and react the liquid recycled polyurethane component with the first isocyanate component to form an isocyanate-functional polymer component having an isocyanate-functional group content greater than zero and less than isocyanate-functional group content of the first isocyanate component. The formed isocyanate-functional polymer component may then be used for forming a polyurethane article or polyurethane foam article that is the reaction product of the formed isocyanate-functional polymer component, a second isocyanate component and an isocyanate-reactive component having hydroxyl-functional groups.

11 Claims, No Drawings

ISOCYANATE-FUNCTIONAL POLYMER COMPONENTS AND POLYURETHANE ARTICLES FORMED FROM RECYCLED POLYURETHANE ARTICLES AND ASSOCIATED METHODS FOR FORMING SAME

BACKGROUND OF THE INVENTION

1. Field of the Invention

The subject disclosure generally relates to isocyanate-functional polymer components and associated polyurethane articles formed from recycled polyurethane articles, and to the associated methods for forming these isocyanate-functional polymer components and polyurethane materials.

2. Description of the Prior Art

Polyurethanes are a class of materials which offer unique physical properties and are suitable for use in a range of applications. Polyurethanes are provided in non-cellular, cellular, or microcellular forms and can be further categorized as rigid, semi-rigid, or flexible polyurethanes. Depending upon the formulations used to form the polyurethanes, they can also be categorized as thermoplastic or thermosetting polymers, as well as elastomeric or non-elastomeric polymers.

Two types of polyurethanes that find usage in a wide variety of polyurethane articles include thermoplastic polyurethanes (TPUs) and cellular foams (including, for example, microcelluar foam (MCU)). TPU is a block copolymer including hard and soft segments (or domains) formed by the reaction of diisocyanates with short-chain diols and long-chain diols. TPUs are typically processed in an extruder or an injection molding device to produce polyurethane articles used in various applications, including but not limited to automotive, footwear, and medical applications. Cellular foams are typically processed by mixing liquid components in a mold under low pressure in the presence of a blowing agent to produce foam polyurethane articles that are also used in automotive and footwear applications. MCU foams are also formed through a two-step process, as is known in the art, in which an isocyanate prepolymer is formed through an exothermic reaction of a hydroxyl-functional polymer containing two or more hydroxyl groups and a diisocyanate. A portion of the isocyanate prepolymer reacts with water to create a carbon dioxide offgas, and the release of the offgas creates a cellular structure. In certain cases, an auxiliary blowing agent is included. The cellular structure is cured, therein forming the MCU foam.

As the prevalence of TPU and cellular foams such as MCU foam are used in forming polyurethane articles increases, the potential for an adverse environmental burden also increases. Typically, after use, polyurethane articles are disposed of in landfills and may create an adverse environmental burden. The polyurethane articles may be in the form of a trimming, a slab, or a formed part (wherein the formed part is actually used for its intended purpose or disposed of prior to use for a variety of reasons), and may be disposed of after off-specification production or after an end use. Due to the potentially adverse environmental burden resulting from the disposal of the polyurethane articles, it would be advantageous to recycle these polyurethane articles.

Various methods of recycling polyurethane articles, including recycling polyurethane articles from the aforementioned TPU and cellular foams, are known in the prior art.

These recycling methods generally include mechanical recycling, in which the polyurethane articles are reused in its polymer form, and chemical recycling, in which the polyurethane articles are broken down into various chemical constituents.

General examples of mechanical recycling of polyurethane articles include, but are not limited to, flexible foam rebond, compression, regrind, powdering (i.e., pulverizing or comminuting), and any combination thereof. One specific example of a mechanical recycling method is disclosed in the U.S. Pat. No. 5,908,894 to Genz et al. More specifically, Genz et al. discloses a process for preparing a TPU compound with reuse of a pulverized MCU. More specifically, the process prepares the TPU compound by reacting an isocyanate, a compound reactive towards an isocyanate, and optionally a chain extender, a catalyst, an auxiliary, and an additive such as a plasticizer with the pulverized microcellular foam.

General examples of chemical recycling of polyurethane articles include, but are not limited to, hydrogenation, pyrolysis, hydrolysis, glycolysis, alcoholysis, acidolysis, cleavage (thermal cleavage or alkaline cleavage), aminolysis, solvolysis, and any combination thereof. Many of these chemically recycling processes are time consuming and cost prohibitive. In addition, certain chemical recycling processes utilize, or result in the formation of other chemical compounds, such as aromatic amines, that are mixed with the desired product that require separation and disposal that may lead to enhanced enviromental concerns as well as increase costs.

While the prior art has identified many methods for recycling of polyurethane articles, there remains new opportunities for the recycling of polyurethane articles that are cost effective and efficient.

SUMMARY OF THE INVENTION AND ADVANTAGES

The subject disclosure relates generally to the use of recycled polyurethanes articles in forming new isocyanate-functional polymer components.

In one embodiment, the subject disclosure discloses a method for forming an isocyanate-functional polymer component, the method comprising:
  forming a first mixture by mixing a recycled polyurethane article in solid form and a first isocyanate component in liquid form having isocyanate-functional groups;
  heating the first mixture to a temperature sufficient to transform the recycled polyurethane article from the solid form to a liquid form; and
  reacting the recycled polyurethane component in the liquid form with the first isocyanate component in liquid form to form the isocyanate-functional polymer component in a liquid form,
  wherein the isocyanate-functional group content (NCO content) of the isocyanate-functional polymer component is greater than zero and is less than an NCO content of the first isocyanate component, wherein the NCO content of the isocyanate-functional polymer component and the NCO content of the first isocyanate component are each determined according to ASTM D2572.

The subject disclosure also relates to the subsequent use of the formed isocyanate-functional polymer components in forming new polyurethane articles. In one embodiment, a method for forming a new polyurethane article includes mixing the isocyanate-functional polymer component in liquid form, formed as described above, with a second isocyanate reactive component and an isocyanate-reactive component to form a second mixture; and reacting the isocyanate-functional groups of the isocyanate-functional polymer component and the second isocyanate component with the hydroxyl-functional groups of the isocyanate-reactive component to form the new polyurethane article.

The subject disclosure also relates to the subsequent use of the formed isocyanate-functional polymer components in forming new polyurethane foam articles. In one embodiment, method for forming a new polyurethane foam article includes mixing the isocyanate-functional polymer component, formed as described above, with a second isocyanate reactive component and an isocyanate-reactive component to form a second mixture; and reacting the isocyanate-functional groups of the isocyanate-functional polymer component and the second isocyanate component with the hydroxyl-functional groups of the isocyanate-reactive component in the presence of a blowing agent to form the new polyurethane foam article.

The subject disclosure also discloses new isocyanate-functional polymer components, and associated new polyurethane articles and new polyurethane foam articles, that are formed in accordance with the methods described above.

The subject disclosure thus provides a simple, efficient method for incorporating recycled polyurethane articles into new and useful polyurethane articles.

Moreover, in certain embodiments, the new polyurethane articles and new polyurethane foam articles that incorporate the recycled polyurethane articles into new polyurethane articles as formed, provide similar, or in certain cases improved, physical properties as compared to polyurethane elastomers formed from utilizing 100 weight percent of the second isocyanate component (i.e., in the absence of the new isocyanate-functional polymer component as a portion of its isocyanate component) when formed from the same starting components at the same NCO/OH weight ratio. Further, the hardness of such new polyurethane articles or new polyurethane foam articles is increased as the amount of the new isocyanate-functional polymer component is increased in their respective formulations.

DETAILED DESCRIPTION OF THE INVENTION

The subject disclosure provides for the use of recycled polyurethane articles, in the formation of isocyanate-functional polymer components and in the subsequent formation of polyurethane articles and polyurethane foam articles.

The term "recycled", as used hereinafter in the phrase "recycled polyurethane articles", refers in general to the use of previously-formed ("pre-formed") polyurethane objects or materials. In other words, any previously formed polyurethane object or material may be used, including those that were used for the prior intended purpose (such as, for example, footwear, automotive headliners or front panels, and the like) or were otherwise not used for any intended purpose (i.e., virgin material, such as scrap or unused commercial products and the like). In other words, the only requirement is for the polyurethane article to be considered a "recycled polyurethane article" as used herein is that it was a pre-formed polyurethane object or material and is now available for use in the subject disclosure. The recycled polyurethane articles may be in the form of conventional, slab, or molded flexible foam; rigid, semi-rigid open and closed foam; microcellular polyurethane (MCU) foam, a thermoplastic polyurethane (TPU) and any combination thereof.

As will be described in further detail below, the isocyanate-functional polymer component of the subject disclosure, in one embodiment, is formed by reacting the recycled polyurethane article in liquid form and an isocyanate component having a known isocyanate-functional group content (NCO content) to form the isocyanate-functional polymer component having an NCO content that is less than the isocyanate component. In a related and further embodiment, the isocyanate-functional polymer component of the subject disclosure formed as above is subsequently used to form a new polyurethane article, or a new polyurethane foam article, in accordance with other embodiments of the subject disclosure.

The isocyanate-functional polymer component of the subject disclosure, and the new polyurethane article, as well as the associated method for forming the isocyanate-functional polymer component and related new polyurethane article, are described in further detail below.

I. Isocyanate-Functional Polymer Component

As noted above, in one aspect of the subject disclosure, recycled polyurethane articles are used to form an isocyanate-functional polymer component in accordance with the subject disclosure. In one embodiment, the isocyanate-functional polymer component is formed by reacting the recycled polyurethane article and an isocyanate component having a known isocyanate-functional group content (NCO content) to form the isocyanate-functional polymer component having an NCO content that is less than the isocyanate component. "NCO content", as utilized in the subject disclosure, refers to the isocyanate-functional group content of a particular isocyanate component as measured in accordance with ISO 14896/3 or the ASTM equivalent ASTM D2572, hereinafter referred to collectively as ASTM D2572.

A. Recycled Polyurethane Articles

The recycled polyurethane articles of the subject disclosure are polyurethane objects or materials that have previously been formed (i.e., are pre-formed) as the reaction product of an isocyanate component (alternatively referred to herein as an isocyanate) and an isocyanate-reactive component.

Preferably, the recycled polyurethane articles of the subject disclosure are in the form of comminuted polyurethane articles. Comminuted polyurethane articles refer to polyurethane articles that are in powder form, or otherwise are in the form of minute particles or fragments.

Typically, the system used to form such recycled polyurethane articles is provided in two or more discrete components, such as the isocyanate component and the isocyanate-reactive (or resin) component, i.e., as a two-component (or 2K) system, which is described further below. It is to be appreciated that reference to the isocyanate component and isocyanate-reactive component, as used herein, is merely for purposes of establishing a point of reference for placement of the individual components of the system, and for establishing a parts by weight basis. As such, it should not be construed as limiting the recycled polyurethane article to only a 2K system. For example, the individual components of the system for pre-forming the recycled polyurethane article can all be kept distinct from each other.

As described above, the recycled polyurethane article of the instant disclosure has been pre-formed as the reaction product of the isocyanate-reactive component and the isocyanate component. It is to be appreciated that one or more isocyanates can be reacted with one or more isocyanate-reactive components to form the recycled polyurethane article. It is also to be appreciated that the isocyanate component is not limited to any particular genus of isocyanate, e.g. the isocyanate component can include monomeric isocyanate, polymeric isocyanate, and mixtures thereof. In addition, the isocyanate component can include prepolymers, e.g. hydroxyl-functional polymers reacted with excess isocyanate.

In certain embodiments, the isocyanate-reactive component comprises a hydroxyl-functional polymer component (sometimes alternatively referred to as a polyol), which is reactive with the isocyanate-functional groups of the isocyanate component. It is to be appreciated that the isocyanate-reactive component can include one or more hydroxyl-functional polymers. Typically, the isocyanate-reactive component includes a combination of hydroxyl-functional polymers. The hydroxyl-functional polymers includes one or more OH functional groups, typically at least two OH functional groups. The hydroxyl-functional polymer typically includes a conventional hydroxyl-functional polymer, such as polyether hydroxyl-functional polyether polymer and/or a hydroxyl-functional polyester polymer. Other suitable hydroxyl-functional polymers include, but are not limited to, biopolyols, such as soybean oil, castor-oil, soy-protein, rapeseed oil, etc., and combinations thereof.

In one embodiment, the isocyanate-reactive component for forming the recycled polyurethane article comprises a hydroxyl-functional polyether polymer. Suitable hydroxyl-functional polyether polymers, for purposes of the subject disclosure include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable hydroxyl-functional polyether polymers include polyether diols and triols, such as polyoxypropylene diols and triols and poly(oxyethyleneoxypropylene)diols and triols obtained by the simultaneous or sequential addition of ethylene and propylene oxides to di- or trifunctional initiators. Copolymers having oxyethylene contents of from about 5 to about 90% by weight, based on the weight of the hydroxyl-functional polyether polymer component, of which the hydroxyl-functional polyether polymers may be block copolymers, random/block copolymers or random copolymers, can also be used. Yet other suitable hydroxyl-functional polyether polymers include polytetramethylene glycols obtained by the polymerization of tetrahydrofuran.

In one embodiment, the hydroxyl-functional polyether polymer is a polyether triol. In this embodiment, the polyether triol has a hydroxyl number of from 20 to 90, more typically from 40 to 70, and most typically 50 to 60, mg KOH/g. Further, the polyether triol of this embodiment typically has a weight average molecular weight of from 1,000 to 10,000, more typically from 2,000 to 6,000, and most typically from 2,500 to 3,500, g/mol. In this embodiment, the hydroxyl-functional polyether polymer is typically present in the isocyanate-reactive component in an amount of greater than 10, more typically greater than 50, still more typically from 75 to 100, and most typically from 85 to 100, parts by weight, based on 100 parts by weight of total hydroxyl-functional polymer present in the isocyanate-reactive component.

In another embodiment, the isocyanate-reactive component comprises a graft polyol. The graft polyol is dispersed polymer solids chemically grafted to a carrier polyol. More specifically, the graft polyol comprises the carrier polyol and particles of copolymerized styrene and acrylonitrile, wherein the particles of co-polymerized styrene and acrylonitrile are dispersed in the carrier polyol, as set forth in more detail below. The graft polyol typically has a nominal functionality of from 2 to 4, more typically from 2.5 to 3.5 and typically has a hydroxyl number of from 10 to 100, more typically from 15 to 50, and most typically 20 to 35, mg KOH/g.

Typically, the carrier polyol of the graft polyol is a hydroxyl-functional polyether polymer. The carrier polyol may be any known hydroxyl-functional polyether polymer in the art and preferably serves as a continuous phase for the dispersed copolymerized styrene and acrylonitrile particles. That is, the co-polymerized styrene and acrylonitrile particles are dispersed in the carrier polyol to form a dispersion, i.e., to form the graft polyol. The particles of co-polymerized styrene and acrylonitrile are typically dispersed in the carrier polyol in an amount of from 10 to 70, more typically from 15 to 60, and most typically from 20 to 55, parts by weight, based on 100 parts by weight of the graft polyol.

If present, the graft polyol is typically present in the isocyanate-reactive component in an amount of from 5 to 100, more typically from 10 to 90, and most typically from 15 to 80, parts by weight, based on 100 parts by weight of total polyol present in the isocyanate-reactive component.

In yet another embodiment, the isocyanate-reactive component comprises a graft polyol and a hydroxyl-functional polyether polymer having a functionality of greater than 2 and a hydroxyl number of from 15 to 100, more typically from 20 to 50, and most typically 25 to 35, mg KOH/g. One non-limiting example of the hydroxyl-functional polyether polymer of this embodiment is a primary hydroxyl terminated polyether triol. If present, the polyether polyol is typically present in the isocyanate-reactive component in an amount of from 5 to 100, more typically from 10 to 75, and most typically from 15 to 45, parts by weight based on 100 parts by weight of total polyol present in the isocyanate-reactive component. If the graft polyol and the hydroxyl-functional polyether polymer are both present in the isocyanate-reactive component, they are typically present in a ratio of from 1:2 to 6:1, more typically from 1:1 to 5:1, and most typically from 2:1 to 4:1.

The isocyanate-reactive component used for pre-forming the recycled polyurethane article typically comprises one or more cross-linking agents. When utilized in the isocyanate-reactive component, the cross-linking agent generally allows phase separation between copolymer segments of the formed recycled polyurethane article. That is, the recycled polyurethane article typically comprises both rigid urea copolymer segments and soft polyol copolymer segments. The cross-linking agent typically chemically and physically links the rigid urea copolymer segments to the soft polyol copolymer segments. Therefore, the cross-linking agent is typically present in the isocyanate-reactive component to modify the hardness, increase stability, and reduce shrinkage of the pre-formed recycled polyurethane article. One non-limiting example of a suitable cross-linking agent is diethanolamine.

The isocyanate-reactive component used for pre-forming the recycled polyurethane article also typically comprises one or more catalysts. The catalyst is typically present in the isocyanate-reactive component to catalyze the reaction between the isocyanate-functional groups of the isocyanate and the hydroxyl-functional groups of the isocyanate-reactive component. It is to be appreciated that the catalyst is typically not consumed in the exothermic reaction between the isocyanate and the hydroxyl-functional polymer component used to pre-form the recycled polyurethane article. More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g. amine catalysts in dipropylene glycol; blowing catalysts, e.g. bis(dimethylaminoethyl)ether in dipropylene glycol; and metal catalysts, e.g. tin, bismuth, lead, etc.

The isocyanate-reactive component used to pre-form the recycled polyurethane article, particularly pre-formed recycled polyurethane foam articles, also typically comprises one or more surfactants. The surfactant typically supports homogenization of a blowing agent and the hydroxyl-functional polymer component and regulates a cell structure of the pre-formed recycled polyurethane foam article. The surfactant may include any suitable surfactant or mixtures of surfactants known in the art. Non-limiting examples of suitable surfactants include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxaneoxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. One specific, non-limiting example of a surfactant is a silicone glycol copolymer.

The isocyanate-reactive component used to pre-form the recycled polyurethane article may optionally include one or more additives. Suitable additives for purposes of the instant disclosure include, but are not limited to, chain-extenders, chain-terminators, processing additives, adhesion promoters, anti-oxidants, defoamers, anti-foaming agents, water scavengers, molecular sieves, fumed silicas, ultraviolet light stabilizers, fillers, thixotropic agents, silicones, colorants, inert diluents, and combinations thereof. If included, the additive can be included in the isocyanate-reactive component in various amounts.

When the pre-formed recycled polyurethane article is in the form of a foam (i.e., is a pre-formed recycled polyurethane foam article), the isocyanate and the isocyanate-reactive component are reacted in the presence of a blowing agent to form the preformed recycled polyurethane foam article. The blowing agent may be a physical blowing agent, a chemical blowing agent, or a combination of a physical blowing agent and chemical blowing agent.

The pre-formed recycled polyurethane foam article used in the subject application can be a "flexible polyurethane foam" or a "rigid polyurethane foam." As used herein, the terminology "flexible polyurethane foam" denotes a particular class of polyurethane foam and stands in contrast to "rigid polyurethane foam." Flexible polyurethane foam is generally porous, having open cells, whereas rigid polyurethane foam is generally non-porous, having closed cells and no rubber-like characteristics. In particular, flexible polyurethane foam is a flexible cellular product which will not rupture when a specimen 200 mm by 25 mm by 25 mm is bent around a 25-mm diameter mandrel at a uniform rate of 1 lap in 5 seconds at a temperature between 18 and 29 degrees Celsius, as defined by ASTM D3574-03.

Further, hydroxyl-functional polymer selection impacts the stiffness of flexible polyurethane foams. Flexible polyurethane foams are typically produced from hydroxyl-functional polymers having weight average molecular weights from about 1,000 to about 10,000 g/mol and hydroxyl numbers from about 10 to about 200 mg KOH/g. In contrast, rigid polyurethane foams are typically produced from hydroxyl-functional polymers having weight average molecular weights from about 250 to about 700 g/mol and hydroxyl numbers from about 300 to about 700 mg KOH/g. Moreover, flexible polyurethane foams generally include more urethane linkages as compared to rigid polyurethane foams, whereas rigid polyurethane foams may include more isocyanurate linkages as compared to flexible polyurethane foams. Further, flexible polyurethane foams are typically produced from low-functionality (f) initiators, i.e., f<4, such as dipropylene glycol (f=2) or glycerine (f=3). By comparison, rigid polyurethane foams are typically produced from hydroxyl-functional polymers having high-functionality initiators, i.e., f>4, such as Mannich bases (f=4), toluenediamine (f=4), sorbitol (f=6), or sucrose (f=8). Additionally, as known in the art, flexible polyurethane foams are typically produced from glycerine-based hydroxyl-functional polymers, whereas rigid polyurethane foams are typically produced from polyfunctional hydroxyl-functional polymers that create a three-dimensional cross-linked cellular structure, thereby increasing the stiffness of the rigid polyurethane foam. Finally, although both flexible polyurethane foams and rigid polyurethane foams include cellular structures, flexible polyurethane foams typically include more open cell walls, which allow air to pass through the flexible polyurethane foam when force is applied as compared to rigid polyurethane foams. As such, flexible polyurethane foams typically recover shape after compression. In contrast, rigid polyurethane foams typically include more closed cell walls, which restrict air flow through the rigid polyurethane foam when force is applied.

The pre-formed recycled polyurethane foam article used in the subject application can be in the form of a "semi-rigid flexible polyurethane foam" (SRU), which includes attributes of both a "flexible polyurethane foam" and "rigid polyurethane foam" as described above.

The terminology "physical blowing agent" refers to blowing agents that do not chemically react with the isocyanate component and/or the isocyanate-reactive component. The physical blowing agent can be a gas or liquid. The liquid physical blowing agent typically evaporates into a gas when heated, and typically returns to a liquid when cooled.

In certain embodiments, the physical blowing agent can also be a gas that is trapped within a polyurethane elastomer shell, wherein the gas expands under heat which causes the shell to grow. In certain embodiments, the physical blowing agent may be introduced via a masterbatch containing both the physical blowing agent and a polymer matrix composition such as ethylene vinyl acetate (EVA), or is simply admixed with the remainder of the components used in forming the polyurethane foam.

The liquid physical blowing agent, in certain embodiments, evaporates into a gas when heated, and typically returns to a liquid when cooled. In certain embodiments, the liquid physical blowing agent is a liquefied gas such as liquefied carbon dioxide or liquid nitrogen.

The terminology "chemical blowing agent" refers to blowing agents which chemically react with the isocyanate or with other components to release a gas for foaming. One specific, non-limiting example of a chemical blowing agent is water. Other non-limiting examples of chemical blowing agents include citric acid or hydrogen carbonate which can also create carbon dioxide.

The blowing agent is typically present in the isocyanate-reactive component for forming the polyurethane foam in an amount of from about 0.5 to about 20 parts by weight, based on 100 parts by weight of total hydroxyl-functional polymer present in the isocyanate-reactive component used for forming the polyurethane foam.

In certain non-limiting embodiments, the pre-formed recycled polyurethane foamed article that is particularly suitable for use in the subject disclosure is a microcellular polyurethane (MCU) foam. It is to be appreciated that the MCU foam may also include additional components other than the MCU.

In certain embodiments, the comminuted MCU foam may be obtained from a supplier. In another embodiment, the MCU foam may be provided in a non-powder form (i.e., a non-comminuted form) and pulverized to produce the comminuted MCU foam. In this latter embodiment, the MCU foam may be obtained from pre-formed MCU foam object or material may be obtained from virgin material. For purposes of the subject disclosure, the recycled MCU foam may be obtained from the pre-formed MCU foam or the virgin material, or a combination of both the pre-formed MCU foam and the virgin material.

The pre-formed MCU foam as described above is distinguished from the virgin material in that the pre-formed MCU foam is initially formed for another use. In certain embodiments, the recycled MCU foam originates as a slab, a trimming, or a formed article or is procured from a waste stream of a manufacturing process. Further, the recycled MCU foam may include a combination of different MCU foams, as described in further detail below, since the recycled MCU foam may be procured from multiple sources.

In contrast, the virgin material is specifically created to produce an MCU foam and is procured from a product stream before being optionally pulverized to form the comminuted recycled MCU foam. Since the virgin material is prepared solely for use to form the isocyanate prepolymers and polyurethane elastomers of the subject disclosure (described below), the virgin material typically comprises only one type of MCU foam.

MCU foams are formed through a two-step process, as known in the art. First, an isocyanate prepolymer is formed through an exothermic reaction of a hydroxyl-functional polymer containing two or more hydroxyl groups and a diisocyanate. Next, the isocyanate prepolymer reacts with water to create a carbon dioxide offgas. A release of the carbon dioxide offgas creates a cellular structure. The cellular structure is then cured, and thereby completes the formation of the MCU foam.

The MCU foam may include methyldiphenyl diisocyanate-based foam, naphthalene diisocyanate-based foam, tolidine diisocyanate-based foam, and combinations thereof. For example, as alluded to above, when the MCU foam is virgin material or from a single source, the MCU foam is typically solely methyldiphenyl diisocyanate-based foam or naphthalene diisocyanate-based foam or tolidine diisocyanate-based foam. Alternatively, in another embodiment, the MCU foam may be a combination of methyldiphenyl diisocyanate-based foam, naphthalene diisocyanate-based foam, and tolidine diisocyanate-based foam, especially when the MCU foam is the recycled MCU foam. For example, when the MCU foam is recycled from a combination of slabs, trimmings, and formed articles, or is provided from multiple sources, the MCU foam is typically a combination of methyldiphenyl diisocyanate-based foam, naphthalene diisocyanate-based foam, and tolidine diisocyanate-based foam.

After pulverization, the particle size of the comminuted polyurethane article based on the MCU foam is preferably from 0.5 to 10 mm. Alternatively, as set forth above, the comminuted polyurethane article may be provided as a pre-made product, in which case the above steps are unnecessary. The resulting comminuted polyurethane article based on the MCU foam (i.e., the comminuted MCU foam) typically has a melt temperature of at least 100-350° C. (degrees Celsius), more typically at least 250° C.

After the comminuted polyurethane article based on the MCU foam is provided and prior to use in the subject disclosure, substantially all of the moisture may be eliminated from the comminuted polyurethane article. More specifically, the moisture is typically eliminated from the comminuted polyurethane article based on MCU foam until the water content is less than or equal to 0.03%. Typically, moisture is eliminated from the comminuted polyurethane article based on MCU foam by drying in an oven for at least 8 hours, but moisture may also be removed with an open heat source. After the moisture is substantially eliminated, the comminuted polyurethane article based on MCU foam may be stored under vacuum. Alternatively, a desiccant may be added, or a combination of storage under vacuum and the addition of a desiccant may be employed. After substantially all of the moisture is removed, the comminuted polyurethane article based on the MCU foam is suitable for use in forming the isocyanate prepolymer.

Exemplary commercially MCU foams that can be used to as the polyurethane article, or as the comminuted polyurethane article, of the subject disclosure include Cellasto® Series MCU foam products commercially available from BASF Corporation of Florham Park, N.J. Alternatively, MCU foams can be obtained from commercial products incorporating MCU foams, such as footwear, automotive headliners, automotive front panels, and the like.

In certain alternative embodiments, the recycled polyurethane article, and typically a comminuted recycled polyurethane article, is a thermoplastic polyurethane (TPU).

The TPU of the subject disclosure are based on the reaction product of a polyol component and an isocyanate-functional component, such as a diisocyanate. Exemplary TPUs may be selected from the group of polyester-based TPUs, polyether-based TPUs, polybutadiene diol-based TPU, dimer-diol based TPU, polyTHF-based TPU, and combinations thereof. Typically, when both a polyester-based TPU and a polyether-based TPU are present, the polyester-based TPU and the polyether-based TPU are present in a ratio of from 1:9 to 9:1, more preferably in a ratio of from 1:7 to 7:1, and most preferably in a ratio of from 1:5 to 5:1.

The polyester-based TPU is formed as the reaction product of a polyester polyol and a diisocyanate. Polyester polyols suitable for producing the polyester-based TPU may comprise the reaction product of a dicarboxylic acid and a glycol having at least one primary hydroxyl group. Dicarboxylic acids that are suitable for producing the polyester polyols may be selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Glycols that are suitable for producing the polyester polyols may be selected from the group of, but are not limited to, ethylene glycol, butylene glycol, hexanediol, bis(hydroxymethylcyclohexane), 1,4-butanediol, diethylene glycol, 2,2-dimethyl propylene glycol, 1,3-propylene glycol, and combinations thereof.

Diisocyanates that are suitable for producing the polyester-based TPU may be selected from the group of, but are not limited to, 4,4'-diphenylmethane diisocyanate, 2,4'-diphenylmethane diisocyanate, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate, and combinations thereof.

In addition, the polyester-based TPU may also include the reaction product of a suitable chain extender. Suitable chain extenders may be selected from the group of, but are not limited to, diols including ethylene glycol, propylene glycol, butylene glycol, 1,4-butanediol, butenediol, butynediol, xylylene glycols, amylene glycols, 1,4-phenylene-bis-β-hydroxy ethyl ether, 1,3-phenylene-bis-β-hydroxy ethyl ether, bis(hydroxy-methyl-cyclohexane), hexanediol, and thiodiglycol; diamines including ethylene diamine, propylene diamine, butylene diamine, hexamethylene diamine, cyclohexalene diamine, phenylene diamine, tolylene diamine, xylylene diamine, 3,3'-dichlorobenzidine, and 3,3'-dinitrobenzidine; alkanol amines such as ethanol amine, aminopropyl alcohol, 2,2-dimethyl propanol amine, 3-aminocyclohexyl alcohol, and p-aminobenzyl alcohol; and combinations thereof. Specific examples of polyester-based TPUs that are suitable for the purposes of the subject disclosure include Elastollan® 600 Series polyester-based TPU resins commercially available from BASF Corporation of Florham Park, N.J.

The polyether-based TPU includes the reaction product of a polyether polyol and a diisocyanate. Suitable diisocyanates include any of those mentioned above as suitable for producing the polyester-based TPU resin. Glycols suitable for producing the polyether-based TPU may be selected from the group of, but are not limited to, polytetramethylene glycol, polyethylene glycol, polypropylene glycol, and combinations thereof. Like the polyester-based TPU resin, the polyether-based TPU may also include the reaction product of a suitable chain extender, and the chain extenders set forth above are also suitable for producing the polyether-based TPU resin. Specific examples of polyether-based TPU resins that are suitable for purposes of the subject disclosure include Elastollan® 1100 Series polyether-based TPU resins available from BASF Corporation of Florham Park, N.J.

Similar to the MCU foam above, the TPU of the subject disclosure, after production, may be pulverized to form a comminuted TPU. Alternatively, the TPU may be provided from a supplier as a comminuted TPU for utilization in the subject disclosure. Accordingly, depending upon the initial chemical composition of the TPU, the comminuted TPU of the subject disclosure may be a comminuted polyester-based TPU, a comminuted polyether-based TPU, or any blends thereof.

B. Isocyanate Component

As also noted above, the isocyanate-functional polymer component of the subject disclosure also includes an isocyanate component having isocyanate-functional groups as a reaction component that reacts with the isocyanate-reactive component. Suitable isocyanates for use in the isocyanate component include, but are not limited to, to those included in the pre-formed polyurethane article above (and others not specifically described above), including, aromatic or aliphatic isocyanate-group containing compounds (i.e., aromatic isocyanates or aliphatic isocyanates) such as methylene diphenyl diisocyanate (MDI), toluene diisocyanate (TDI), polymethylene polyphenylisocyanate (PMDI), hexamethylene diisocyanate (HDI), a uretonimine polymer, an isocyanate-terminated prepolymer, and any combinations thereof.

The isocyanate component for use in forming the isocyanate-functional polymer component typically has an average functionality of from about 1.5 to about 3.0, more typically from about 2.0 to about 2.8, and yet more typically about 2.7. The isocyanate component also typically has an NCO content varying from a few weight percent to around 50 weight percent, depending upon the isocyanate component. For aliphatic isocyanates, the NCO content may range from about 18 to 30 wt. %. For aromatic isocyanates, the NCO content may range from 25 to 50 wt. %. For isocyanate prepolymers the range may vary from 1 to 47 wt. %, more typically 1-29 wt. %. For hexamethylene diisocyanate (HDI), the isocyanate component typically has an NCO content of from about 20 to about 23.5 wt. %. For methylene diphenyl diisocyanate (MDI), the isocyanate component typically has an NCO content of from about 29 to about 34 wt. %. For toluene diisocyanate (TDI), the isocyanate component typically has an NCO content of from about 45 to about 50 wt. %.

The isocyanate-terminated prepolymer, when comprising or otherwise present in the isocyanate component, is generally the reaction product of an isocyanate component (such as those described above) and an active hydrogen-containing species and is formed by various methods understood by those skilled in the art or can be obtained commercially from a manufacturer, a supplier, etc. The active hydrogen-containing species can alternatively be referred to as an isocyanate-reactive component having reactive groups (i.e., compounds or compositions having active hydrogen atoms) reactive with the isocyanate-functional groups of the isocyanate component.

In certain embodiments, the isocyanate component of the isocyanate-terminated prepolymer is selected from the group of methylene diphenyl diisocyanate (also sometimes referred to as diphenylmethane diisocyanate, MDI, or monomeric MDI), polymethylene polyphenyl diisocyanate (also sometimes referred to as polymeric diphenylmethane diisocyanate, polymeric MDI or PMDI), and combinations thereof. MDI exists in three isomers (2,2'-MDI, 2,4'-MDI, and 4,4'-MDI) however, the 4,4' isomer (sometimes referred to as Pure MDI) is most widely used. For the purposes of the subject disclosure, the term "MDI" refers to all three isomers unless otherwise noted. In certain embodiments, the second isocyanate-terminated prepolymer comprises a blend of PMDI and quasi-prepolymers of 4,4'-methyldiphenyldiisocyanate.

The isocyanate-reactive component used for forming the isocyanate-terminated prepolymer is preferably a polymer that includes one or more hydroxyl groups (OH-functional groups), or more commonly referred to as a hydroxyl-functional polymer. The isocyanate component is a polymer that includes one or more isocyanate groups (NCO groups) that react with the hydroxyl groups to form carbamate (i.e., urethane) links.

In certain embodiments, the hydroxyl-functional polymer is a hydroxyl-functional polyether (i.e., hydroxyl-functional polyether-group containing polymers), while in other embodiments the hydroxyl-functional polymer is a hydroxyl-functional polyester (i.e., hydroxyl-functional polyester-group containing polymers). In yet other embodiments, the isocyanate-reactive component hydroxyl-functional polymer can be a mixture of a hydroxyl-functional polyether and a hydroxyl-functional polyester.

The hydroxyl-functional polyether used as one of the reactants in forming the isocyanate-terminated prepolymer of the subject disclosure are polyether polymers that include one or more hydroxyl-functional groups, typically at least two OH-functional groups. Accordingly, the hydroxyl-functional polyether are polyether polymers having one OH-functional group (i.e., a polyether monol), two OH-functional groups (i.e., a polyether diol), three OH-functional groups (i.e., a polyether triol), four OH-functional groups (i.e., a polyether tetrol), polyether-group containing polymers having more than four OH-functional groups, and combinations thereof. The hydroxyl functionality of these hydroxyl-functional polyethers is typically expressed in terms of an average functionality of all of the respective polymer chains present in the collective hydroxyl-functional polyether blend.

Hydroxyl-functional polyethers having an average of two or more OH-functional groups per molecule are sometimes alternatively referred to as polyether polyols, which are typically formed as the polymeric reaction product of an organic oxide and an initiator compound containing two or more active hydrogen atoms. The active hydrogen compound in the presence of a base catalyst initiates ring opening and oxide addition, which is continued until the desired molecular weight is obtained. If the initiator has two active hydrogens, a diol results. If a trifunctional initiator such as glycerine is used, the oxide addition produce chain growth in three directions, and a triol results.

The hydroxyl-functional polyether can be any type of hydroxyl-functional polyether known in the art. The hydroxyl-functional polyether can be non-ethoxylated or ethoxylated. In addition, the hydroxyl-functional polyether can be short chain, low molecular weight hydroxyl-functional polyether having one or more OH-functional groups. Particularly suitable hydroxyl-functional polyether or polyethers for use in the polyurethanes include, but are not limited to, products obtained by the polymerization of a cyclic oxide, for example ethylene oxide (EO), propylene oxide (PO), butylene oxide (BO), or tetrahydrofuran in the presence of initiator compounds having one or more active hydrogen atoms. Suitable initiator compounds including a plurality of active hydrogen atoms for use in obtaining hydroxyl-functional polyethers include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable hydroxyl-functional polyether or polyethers include polyether diols and triols, such as poly-oxypropylene diols and triols and poly(oxyethyleneoxypropylene)diols and triols obtained by the simultaneous or sequential addition of ethylene and propylene oxides to di- or tri-functional initiators. Copolymers having oxyethylene contents of from about 5 to about 90% by weight, based on the weight of the polyether polyol component, of which the polyether polyols may be block copolymers, random/block copolymers or random copolymers, can also be used. Yet other suitable hydroxyl-functional polyethers include poly-tetramethylene ether glycols obtained by the polymerization of tetrahydrofuran.

Particularly suitable hydroxyl-functional polyether or polyethers for use include those based on a totally heteric (or random) EO (ethylene oxide), PO (propylene oxide) structure, or those having heteric, but uniform blocks of EO and PO, e.g. blocks comprising EO and blocks comprising PO. As yet another suitable example, the hydroxyl-functional polyether can have heteric blocks and uniform blocks of EO and PO, e.g. blocks comprising all EO or PO and blocks comprising random EO, PO. Still further, in certain examples, the hydroxyl-functional polyether can be heteric or random copolymers of EO and PO which are endblocked with either EO or PO. One particularly suitable hydroxyl-functional polyether comprises a polyether-triol having ethyleneoxide terminal groups.

Suitable non-limiting commercial hydroxyl-functional polyether or polyethers having an average of two OH-functional groups per molecule, sometimes referred to as polyether diols, for use in forming the isocyanate-terminated prepolymers in the subject disclosure are based upon the propoxylation and/or ethoxylation of diethylene glycol, dipropylene glycol, ethylene glycol, or propylene glycol include Pluracol® P410R, 1010, 2010, 1062, and 1044, each commercially available from BASF Corporation of Florham Park, N.J. In particular, Pluracol® P410R, 1010, 2010, and 1044 are PO-containing hydroxyl-functional polyether diols, while Pluracol® 1062 is a PO-containing hydroxyl-functional polyether diols endcapped with EO.

Suitable non-limiting commercial hydroxyl-functional polyether or polyethers having an average of three OH-functional groups per molecule, sometimes referred to as polyether triols, for use in forming the isocyanate-terminated prepolymers of the subject disclosure are based on the propoxylation and/or ethoxylation of glycerin or trimethylolpropane include Pluracol® GP430, GP730, 4156, 2090, and 816, each commercially available from BASF Corporation of Florham Park, N.J. In particular, Pluracol® GP430 and GP730 are PO-containing hydroxyl-functional polyether triols, Also, Pluracol® 2090 and 816 are a PO-containing hydroxyl-functional polyether triol endcapped with EO, while Pluracol® 4156 is a pure heteric hydroxyl-functional polyether triol.

Suitable non-limiting commercial hydroxyl-functional polyether or polyethers having an average of four OH-functional groups per molecule, sometimes referred to as polyether tetrols, propoxylation and/or ethoxylation of toluene diamine, ethylene diamine, and pentaerythritol for use in forming the isocyanate-terminated prepolymers of the subject disclosure include Pluracol® 735, 736 and PEP 500 and Quadrol, each commercially available from BASF Corporation of Florham Park, N.J. In particular, Pluracol® 735 and 736 toluene diamine initiated hydroxyl-functional polyether polyols based on PO, Pluracol® PEP 500 is a pentaerythritol-initiated heteric, and Quadrol is an ethylene diamine initiated hydroxyl-functional polyether polyols based on PO.

One suitable non-limiting commercial higher hydroxyl-functional polyethers for use in forming the isocyanate-terminated prepolymers of the subject disclosure are based on sucrose, sorbitol or combinations thereof alone or in combination with other initiators is Pluracol® SG360 (based on sucrose and glycerin), commercially available from BASF Corporation of Florham Park, N.J.

In certain of these embodiments, the hydroxyl-functional polyether or polyethers for use in forming the isocyanate-terminated prepolymers of the subject disclosure have a weight average molecular weight (Mw) ranging from 60 to 10,000, such as 180 to 6,500, g/mol, as measured by gel permeation chromatography (GPC) or nuclear magnetic resonance (NMR) previously calibrated using a calibration curve based on mono-dispersed polystyrene standards.

In certain embodiments, a combination of two or more hydroxyl-functional polyethers for use in forming the isocyanate-terminated prepolymers of the subject disclosure can be used, with each one of the two or more hydroxyl-functional polyethers having the same or a different weight average molecular weight within the range of 60 to 10,000, such as 180 to 6,500, g/mol described above. Thus, for example, the hydroxyl-functional polyethers used may include a first hydroxyl-functional polyether having a weight average molecular weight ranging from 60 to 10,000, such as 180 to 6,500, g/mol and a second hydroxyl-functional polyether different from the first hydroxyl-functional polyether also having a weight average molecular weight ranging from 60 to 10,000, such as 180 to 6,500, g/mol. Representative examples of the two or more hydroxyl-functional polyethers include those described in the paragraphs above.

In even further embodiments, in addition to the hydroxyl-functional polyether, the isocyanate-reactive component used in forming the isocyanate-terminated prepolymers further includes a styrene-acrylonitrile graft polyol.

In certain embodiments, in addition to or in place of the hydroxyl-functional polyether, the isocyanate-reactive component used in forming the isocyanate-terminated prepolymers may be in the form of another hydroxyl-functional polymer, including but not limited to hydroxyl-functional polyesters and hydroxyl-functional acrylics.

Suitable hydroxyl-functional polyesters for use in forming the isocyanate-terminated prepolymers, include, for example polyester polymers that include one or more hydroxyl-functional groups, typically at least two OH-functional groups. Accordingly, the hydroxyl-functional polyesters are polyester polymers having one OH-functional group (i.e., a polyester monol), two OH-functional groups (i.e., a polyester diol), three OH-functional groups (i.e., a polyester triol), four OH-functional groups (i.e., a polyester tetrol), polyether-group containing polymers having more than four OH-functional groups, and combinations thereof. Hydroxyl-functional polyesters having an average of two or more OH-functional groups per molecule are sometimes alternatively referred to as polyester polyols, Suitable hydroxyl-functional polyesters include, but are not limited to, aromatic group containing hydroxyl-functional polyesters, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramides polyols for use in forming the isocyanate-terminated prepolymers may be obtained by the inclusion of aminoalcohols such as ethanolamine in polyesterification mixtures. Suitable polythioether polyols include products obtained by condensing thiodiglycol either alone or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

In addition, lower molecular weight hydroxyl-functional compounds may also be utilized in forming the isocyanate-terminated prepolymers, such as ethylene glycol, diethylene glycol, propylene glycol, dipropylene glycol, butane diol, glycerol, trimethylpropane, triethanolamine, pentaerythritol, sorbitol, and combinations thereof.

The isocyanate-reactive component for use in forming the isocyanate-terminated prepolymers may also include one or more catalysts. The catalyst is typically present in the isocyanate-reactive component to catalyze the reaction between the isocyanate component and the isocyanate-reactive component. That is, isocyanate-reactive component typically includes a "polyurethane catalyst" which catalyzes the reaction between an isocyanate and a hydroxy functional group. It is to be appreciated that the catalyst is typically not consumed in the exothermic reaction between the isocyanate and the polyol. More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g., amine catalysts in dipropylene glycol; blowing catalysts, e.g., bis(dimethylaminoethyl)ether in dipropylene glycol; and metal catalysts, e.g., organo-tin compounds, organo-bismuth compounds, organo-lead compounds, etc.

This catalyst may be any in the art. In one embodiment, the isocyanate catalyst is an amine catalyst. In another embodiment, the isocyanate catalyst is an organometallic catalyst.

The isocyanate catalyst may be or include a tin catalyst. Suitable tin catalysts include, but are not limited to, tin(II) salts of organic carboxylic acids, e.g. tin(II) acetate, tin(II) octoate, tin(II) ethylhexanoate and tin(II) laurate. In one embodiment, the isocyanate catalyst is or includes dibutyltin dilaurate, which is a dialkyltin(IV) salt of an organic carboxylic acid. Specific examples of non-limiting isocyanate catalysts are commercially available from Air Products and Chemicals, Inc. of Allentown, PA, under the trademark DABCO®. The isocyanate catalyst can also include other dialkyltin(IV) salts of organic carboxylic acids, such as dibutyltin diacetate, dibutyltin maleate and dioctyltin diacetate.

Examples of other suitable but non-limiting isocyanate catalysts include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable but non-limiting isocyanate catalysts include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trademark POLYCAT®.

Yet further examples of other suitable but non-limiting isocyanate catalysts include dimethylaminoethanol, dimethylaminoethoxyethanol, triethylamine, N,N,N',N'-tetramethylethylenediamine, N,N-dimethylaminopropylamine, N,N,N',N',N"-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N"-pentamethyldiethylenetriamine, 1,2-dimethylimidazole, 3-(dimethylamino) propylimidazole, and combinations thereof. In various embodiments, the isocyanate catalyst is commercially available from Air Products and Chemicals, Inc. under the trademark POLYCAT®. The isocyanate catalyst may include any combination of one or more of the aforementioned catalysts. In still other embodiments, the catalyst is chosen from DABCO TMR, DABCO TMR-2, DABCO HE, DABCO 8154, PC CAT DBU TA 1, PC CAT Q1, Polycat® SA-1, Polycat® SA-102, salted forms, and/or combinations thereof.

In other embodiments, the catalyst is chosen from dibutyltin dilaurate, dibutyltin oxide (e.g. as a liquid solution in $C_8$-$C_{10}$ phthalate), dibutyltin dilaurylmercaptide, dibutyltin bis(2-ethylhexylthioglycolate), dimethyltin dilaurylmercaptide, diomethyltin dineodecanoate, dimethyltin dioleate, dimethyltin bis(2-ethylhexylthioglycoate), dioctyltin dilaurate, dibutyltin bis(2-ethylhexoate), stannous octoate, stannous oleate, dibutyltin dimaleate, dioctyltin dimaleate, dibutyltin maleate, dibutyltin mercaptopropionate, dibutyltin bis(isoodyithioglycolate), dibutyltin diacetate, dioctyltin oxide mixture, dioctyltin oxide, dibutyltin diisooctoate, dibutyltin dineodecanoate, dibutyltin carboxylate, dioctyltin carboxylate, and combinations thereof.

The isocyanate catalyst for use in forming the isocyanate-terminated prepolymers can be utilized in various amounts. For example, in various embodiments, the isocyanate catalyst is utilized in an amount of from 0.0001 to 10, from 0.0001 to 5, from 5 to 10, weight percent based on a total weight percent of reactants or the isocyanate or any other value or range of values therebetween. Typically, an amount of catalyst used depends on a temperature of the process. For example, at 150° F. (about 65.5° C.), 0.0001% may be utilized, while at room temperature 0.001 to 10%, such as 5-10%, such as 0.001 to 1%, may be utilized.

The isocyanate-reactive component for use in forming the isocyanate-terminated prepolymers may also include various additional additives. Suitable additives include, but are not limited to, anti-foaming agents, processing additives, plasticizers, chain terminators, surface-active agents, flame retardants, anti-oxidants, water scavengers, fumed silicas, dyes or pigments, ultraviolet light stabilizers, fillers, thixotropic agents, silicones, amines, transition metals, and combinations thereof. The additive may be included in any amount as desired by those of skill in the art. For example, a pigment additive allows the polyurethane elastomer composition to be visually evaluated for thickness and integrity and can provide various marketing advantages.

Suitable hydroxyl-functional acrylics for use in forming the isocyanate-terminated prepolymers are obtained by free-radical polymerization of acrylate and methacrylate esters and styrene (such as ethyl acrylates (EA) or butyl acrylates (BA), acrylic acid (AA), methyl methacrylate (MMA), or styrene (ST)). Hydroxyl functionality is introduced by adding ethylenically unsaturated monomers having at least one free hydroxyl group, typically hydroxy-functional acrylates (HFAs) such as 2-hydroxyethyl acrylates (HEA) or 4-hydroxybutyl acrylates (HBA), to the monomer blend. One exemplary 100% solids acrylic-modified polyether polyol in Joncryl 569, commercially available from BASF Corporation of Florham Park, N.J., having a hydroxyl number of 140 mg KOH/g.

Specific examples of suitable isocyanate-terminated prepolymers, for purposes of the subject disclosure, are commercially available from BASF Corporation of Florham Park, N.J., under the trademark Lupranate®, such as Lupranate® MP102. It is to be appreciated that the system can include a combination of two or more of the aforementioned isocyanate-terminated prepolymers.

Exemplary diisocyanates that may be used in forming the polycarbodiimide include, but are not limited to: MDI (in any the three isomers (2,2'-MDI, 2,4'-MDI, and 4,4'-MDI); m-phenylene diisocyanate; 2,4-toluene diisocyanate; 2,6-toluene diisocyanate; hexamethylene diisocyanate; 1,4-phenylene diisocyanate; tetramethylene diisocyanate; cyclohexane-1,4-diisocyanate; hexahydrotoluene diisocyanate; methylenediisocyanate; 2,6-diisopropylphenyl isocyanate; m-xylylene diisocyanate; dodecyl isocyanate; 3,3'-dichloro-4,4'-diisocyanato-1,1'-biphenyl; 1,6-diisocyanato-2,2,4-trimethylhexane; 3,3'-dimethoxy-4,4'-biphenylene diisocyanate; 2,2-diisocyanatopropane; 1,3-diisocyanatopropane; 1,4-diisocyanatobutane; 1,5-diisocyanatopentane; 1,6-diisocyanatohexane; 2,3-diisocyanatotoluene; 2,4-diisocyanatotoluene; 2,5-diisocyanatotoluene; 2,6-diisocyanatotoluene; isophorone diisocyanate; hydrogenated methylene bis(phenylisocyanate); naphthalene-1,5-diisocyanate; 1-methoxyphenyl-2,4-diisocyanate; 1,4-diisocyanatobutane; 4,4'-biphenylene diisocyanate; 3,3'-dimethyldiphenylmethane-4,4'-diisocyanate; 4,4',4"-triphenylmethane triisocyanate; toluene-2,4,6-triisocyanate; 4,4'-dimethyldiphenylmethane-2,2',5,5'-tetraisocyanate; polymethylene polyphenylene polyisocyanate; or a mixture of any two or more thereof. In a preferred embodiment, the diisocyanate is 2,4-toluene diisocyanate, 2,6-toluene diisocyanate, or a mixture of 2,4- and 2,6-toluene diisocyanate.

In certain embodiments, the isocyanate component for forming the polycarbodiimide comprises MDI (in any the three isomers (2,2'-MDI, 2,4'-MDI, and 4,4'-MDI). Alternatively, the isocyanate component may comprise a blend of two or all three of these three MDI isomers, i.e., the isocyanate component may comprise at least two of 2,2'-MDI, 2,4'-MDI, and 4,4'-MDI.

In certain other embodiments, the isocyanate component for forming the polycarbodiimide comprises toluene diisocyanate (TDI). The isocyanate component may comprise either isomer of toluene diisocyanate (TDI), i.e., the isocyanate component may comprise 2,4-toluene diisocyanate (2,4-TDI) or 2,6-toluene diisocyanate (2,6-TDI). Alternatively, the isocyanate component may comprise a blend of these isomers, i.e., the isocyanate component may comprise both 2,4-toluene diisocyanate (2,4-TDI) and 2,6-toluene diisocyanate (2,6-TDI). One specific example of a commercially available isocyanate component suitable for the purposes of the subject disclosure is Lupranate® T-80, which is commercially available from BASF Corporation of Florham Park, N.J. Notably, Lupranate® T-80 comprises a blend of 2,4-toluene diisocyanate (2,4-TDI) and 2,6-toluene diisocyanate (2,6-TDI). In certain embodiments, the isocyanate component consists essentially of, or consists of, TDI. Generally, the isocyanate component comprises TDI in an amount of from greater than 95, alternatively greater than 96, alternatively greater than 97, alternatively greater than 98, alternatively greater than 99, percent by weight based on the total weight of isocyanate present in the isocyanate component.

While exemplary embodiments of the recycled polyurethane article of the subject disclosure are described in detail with respect to the use of a MCU foam or TPU as the recycled polyurethane article, the subject application is not limited to the use of these specific recycled polyurethane articles. For example, other non-limiting polyurethanes that could be used include each of the polyurethanes described above, such as flexible cellular foams distinct from the MCU foams described above. Still further, other flexible, semi-rigid, or rigid polyurethane foams that are not otherwise categorized as flexible cellular foams or MCU foams, as well as polyurethane elastomeric materials, are also contemplated.

II. Method for Forming Isocyanate-Functional Polymer Component

To form the isocyanate-functional polymer component according to the subject disclosure, the recycled polyurethane article, preferably in the form of the comminuted recycled polyurethane article, is first mixed with an isocyanate component having isocyanate-functional groups, as also described above, to form a mixture. The isocyanate component is preferably in liquid form at room temperature and has a known isocyanate-functional group content (NCO content), based upon the total weight of the isocyanate component included in the mixture.

As provided herein, comminuted polyurethane articles refer to polyurethane articles that are solids in powder form, or otherwise are in the form of minute particles or fragments.

In embodiments wherein the recycled polyurethane article is not in comminuted form, an additional step of pulvering to recycled polyurethane article to form the comminuted recycled polyurethane article is also included in the method.

In order to ensure that the formed isocyanate-functional polymer component, as will be described in further detail below, includes isocyanate-functional groups, an excess amount of isocyanate component is present in the original mixture.

Next, in certain embodiments the mixture is heated to a temperature sufficient to transform the recycled polyurethane article from a solid form to a liquid form. The temperature sufficient to transform the recycled polyurethane article is dependent upon the composition of the components comprising the comminuted polyurethane article. In the case wherein the recycled polyurethane article is a mixture of more than one polyurethane article components having varying chemical compositions (such as, for example, a mixture of two or more chemically distinct comminuted MCU foams, or a mixture of two or more chemically distinct comminuted TPUs, or a blend of at least one MCU foam and at least one TPU), the temperature is greater than or equal to transform each respective distinct recycled polyurethane article from solid form to liquid form.

The temperatures necessary to transform the MCU foam, or the TPU, from solid to liquid form, as noted above, range from 100 to 350 degrees Celsius.

Next, the recycled polyurethane article in liquid form and the isocyanate component are held at or above the liquefying temperature for a period of time sufficient such that the recycled polyurethane article in liquid form reacts with the isocyanate component to form an isocyanate-functional polymer component. In certain embodiments, the formed isocyanate-functional polymer component includes an amount of the isocyanate component that is partially reacted with liquid recycled polyurethane article, and in further embodiments may also include an amount of the isocyanate component that is not reacted with the liquid recycled polyurethane article (and thus remains as an unreacted isocyanate component).

The reaction is monitored by visual inspection for the substantial or full disappearance of the solid form of the recycled polyurethane article into the isocyanate component. Accordingly, as described herein, the term "liquid form" generally coincides with the substantial absence of a "solid form" as determined by visual inspection. It is recognized herein, for the purposes of the subject disclosure, that the recycled polyurethane article is considered to be in "liquid form" even when a small percentage, such as less than 5% by weight, and more typically less than 1% by weight, of the total weight of the recycled polyurethane article remains in solid form. This residual material may be in the form of insoluble particles or other materials that remain. These insoluble particles or materials may include various additives, such as inorganic fillers and the like, or other organic materials, or in certain instance may be a small portion of residual recycled polyurethane article that is not transformed as remains visible as described above.

Once the visual inspection confirms the substantial absence of the solid form, the extent of the reaction can be confirmed by measuring the isocyanate-functional group content (i.e., the NCO content, sometimes referred to as the free NCO content) of the formed isocyanate-functional polymer component, which is based on the total weight of the isocyanate-functional polymer component. The total weight of the isocyanate-functional polymer component is the sum total of the weight of the recycled polyurethane article in liquid form and the weight of the isocyanate component (i.e., the weight of the mixture, prior to reaction). The NCO content can be determined by conventional methods known to those of ordinary skill in the analysis of polyurethanes in accordance with ASTM D2572, as noted above. A reaction is confirmed when the measured NCO content of the isocyanate-functional polymer component is less than the NCO content of the isocyanate component.

In embodiments utilizing the MCU foam or TPU as the recycled polyurethane article, the time sufficient to react the liquid MCU foam or liquid TPU, such as wherein the mixture is heated to a temperature from 100 to 350 degrees Celsius, with the isocyanate component to form an isocyanate-functional polymer component ranges from 1 hour to 48 hours, depending upon the type of MCU foam or TPU and the type of isocyanate component utilized.

In certain embodiments, the time sufficient to react the liquid recycled polyurethane article with the isocyanate component to form an isocyanate-functional polymer component is sufficient to achieve an NCO content of the isocyanate-functional polymer component that ranges from 2 to 98 weight percent less of the NCO content of the isocyanate component prior to reaction.

In certain embodiments, the isocyanate-functional polymer component of the subject disclosure has an NCO content ranging from 1 to 47 weight percent, based on the total weight of the isocyanate-functional polymer component of the subject disclosure, with the proviso that the NCO content of the isocyanate-functional component is less than the NCO content of the isocyanate component utilized.

In certain other embodiments, in addition to having the NCO content as described in any embodiment above, the formed isocyanate-functional polymer component of the subject disclosure also has a viscosity of from 5 to 10,000 centipoise (cP, with one cP equal to one millipascal-second (mPa·s)) measured in accordance with the method ASTM standard D2196. In still further embodiments, the isocyanate-functional polymer component has viscosity of from 5 to 10,000 centipoise (cP, with one cP equal to one millipascal-second (mPa·s)) measured at 25 degrees Celsius in accordance with the method ASTM standard D2196, or alternatively has a viscosity of 5 to 10,000 centipoise measured as high as 150 degrees Celsius in accordance with the method corresponding to ASTM D2196. In this way, the isocyanate-functional component formed in accordance with the subject disclosure is sufficiently liquid such that it may be used in forming new polyurethane articles and polyurethane foam articles, as described below.

In still further embodiments, the method for forming the isocyanate-functional polymer component may optionally include the step of filtering, or otherwise removing, the insoluble particles or other materials that may remain in the isocyanate-functional polymer component after the completion of the reaction (as evidenced by the NCO content reduction). These insoluble particles or materials, which are described above, generally do not affect the subsequent use of the formed isocyanate-functional polymer component in forming new polyurethane articles or new polyurethane foam articles, as described below, but are desirable for removal in order to improve the aesthetic appearance of any new polyurethane articles or new polyurethane foam articles in accordance with the subject disclosure.

III. New Polyurethane Articles Formed from the Isocyanate-Functional Polymer Component As noted above, the subject disclosure also discloses new polyurethane articles, such as new polyurethane foam articles, that are formed by including the isocyanate-functional polymer component, as formed above, as at least a portion of the isocyanate component.

The term "new", as used in relation to "new polyurethane articles" and "new polyurethane foam articles", refers to the reaction product formed in the subject disclosure and serves to distinguish from the recycled polyurethane articles described above.

The new polyurethane articles of the subject disclosure, and associated new polyurethane foam articles, are formed as the reaction product of the isocyanate-functional polymer component according to any embodiment described above; a second isocyanate component having isocyanate-functional groups; and an isocyanate-reactive component having hydroxyl-functional groups reactive with the isocyanate-functional groups of the isocyanate-functional polymer component and the second isocyanate component.

The method for forming the new polyurethane article of the subject disclosure comprises: forming the isocyanate-functional polymer component as described above; providing a second isocyanate component the same or different from the first isocyanate component (i.e., the isocyanate component used in forming the isocyanate-functional polymer component described above); providing an isocyanate-reactive component having hydroxyl-functional groups reactive the isocyanate-functional groups of the isocyanate-functional polymer component and the second isocyanate component; forming a second mixture by mixing the provided second isocyanate component and the provided second isocyanate-functional polymer component and the isocyanate-reactive component; and reacting the isocyanate-functional groups of the isocyanate-functional polymer component and the second isocyanate component with the hydroxyl-functional groups of the isocyanate-reactive component to form the polyurethane elastomer. The method for forming the new polyurethane foam articles include wherein the reaction product is formed in the presence of a blowing agent, and thus the resultant structure of the new polyurethane foam article is formed as a cellular structure having open cells formed therewithin.

Suitable isocyanates for use as the second isocyanate component are the same as those described above for use in forming the isocyanate-functional polymer component or were initially utilized in forming the recycled polyurethane article and include, but are not limited to, aromatic or aliphatic isocyanate-group containing compounds (i.e., aromatic isocyanates or aliphatic isocyanates) such as methylene diphenyl diisocyanate (MDI), toluene diisocyanate (TDI), polymethylene polyphenylisocyanate (PMDI), hexamethylene diisocyanate (HDI), a uretoimine polymer, an isocyanate-terminated prepolymer, and any combinations thereof. Similar to above, the second isocyanate component typically has an average functionality of from about 1.5 to about 3.0, more typically from about 2.0 to about 2.8, and yet more typically about 2.7.

In certain embodiments, the second isocyanate component is the same composition as the isocyanate component used to form the isocyanate-functional polymer component. In other embodiments, the composition of second isocyanate component is different than the composition of the isocyanate component used to form the isocyanate-functional polymer component but is selected from any of the isocyanate components described above.

Similarly, the isocyanate-reactive component having hydroxyl-functional groups for use in forming the new polyurethane article, or new polyurethane foam article, can be selected from the same isocyanate-reactive component having hydroxyl-functional groups described above for forming the isocyanate-prepolymer. In these embodiments, the isocyanate-reactive component includes hydroxyl-functional groups (OH) that can react with the isocyanate-functional groups present in the isocyanate-functional polymer component and in the second isocyanate component.

In certain embodiments, the ratio of isocyanate-functional groups of the isocyanate-functional polymer component and the second isocyanate component to the hydroxyl-functional groups of the isocyanate-reactive component (i.e., the NCO:OH ratio) ranges from 0.90:1 to 3.0:1.

For new flexible polyurethane articles, such as new flexible polyurethane foam articles, the NCO:OH ratio ranges from 0.90:1 to 1.05:1. For new rigid polyurethane articles, such as new rigid polyurethane foam articles, the NCO:OH ratio ranges from 1.05:1 to 3.0:1. For new semi-rigid polyurethane articles, such as new semi-rigid polyurethane foam articles, the NCO:OH ratio generally is around 1.05:1.

In still further embodiments, the isocyanate-functional polymer component comprises from 1 to 99 weight percent of the total combined weight of the isocyanate-functional polymer component and the second isocyanate component.

In further embodiments, the new polyurethane article, or new polyurethane foam article, may include an additional component selected from the group consisting of chain extenders, amines, catalysts, tin catalysts, crosslinkers (i.e., curing agents), adhesion promotors, wetting agents, and any combination thereof.

The chain extender used to form the new polyurethane article, or new polyurethane foam article, according to the subject disclosure suitably comprises compounds having 2 or more active hydrogens and molecular weights ranging from 60 g/mol to 400 g/mol, such as from 60 g/mol to 200 g/mol. Suitable chain extenders having 2 or more active hydrogens include, for example, diols and higher hydroxyl-functional compounds or compositions such as 1,4-butanediol, ethylene glycol, diethylene glycol, propylene glycol, butylene glycol, 1,4-butylene glycol, butenediol, butynediol, xylylene glycols, amylene glycols, 1,5-pentylene glycol, methylpentanediol, 1,6-hexylene glycol, neopentyl glycol, trimethylolpropane, hydroquinone ether alkoxylate, resorcinol ether alkoxylate, glycerol, pentaerythritol, diglycerol, dextrose, 1,4-phenylenebis-3-hydroxy ethyl ether, 1,3-phenylene-bis-3-hydroxy ethyl ether, bis-(hydroxymethyl-cyclohexane), hexanediol, thiodiglycol, and a 1,4:3,6 dianhydrohexitol such as isomannide; isosorbide and isoidide; aliphatic polyhydric amines such as ethylenediamine, hexamethylenediamine, and isophorone diamine; and aromatic polyhydric amines such as methylene-bis(2-chloroaniline), methylenebis(dipropylaniline), diethyl-toluenediamine, trimethylene glycol di-p-aminobenzoate; alkanolamines such as diethanolamine, triethanolamine and diisopropanolamine.

In certain embodiments, the chain extender is a diol, such as the one or more diols from the list as provided above. If higher functional polyols, such as triols, are included, they are typically introduced in combination with the diols as provided above and in low relative amounts to limit cross-linking and prevent the resultant new polyurethane article or new polyurethane foam article from becoming too brittle.

The isocyanate-reactive component used to form the new polyurethane article, or new polyurethane foam article, may also include one or more amines. Any amine known in the art may be utilized, and in certain instances may also be described as a chain extender. Suitable amines that could be considered a chain extender include diamines including ethylene diamine, propylene diamine, butylene diamine, hexamethylene diamine, cyclohexalene diamine, phenylene diamine, tolylene diamine, xylylene diamine, 3,3'-dichlorobenzidine, and 3,3'-dinitrobenzidine; alkanol amines such as ethanol amine, aminopropyl alcohol, 2,2-dimethyl propanol amine, 3-aminocyclohexyl alcohol, and p-aminobenzyl alcohol; and combinations thereof. In further embodiments, the amine may be chosen from MDA, TDA, ethylene-, propylene-butylene-, pentane-, hexane-, octane-, decane-, dodecane-, tetradecane-, hexadecane-, octadecane-diamines, Jeffamines-200, -400, -2000, -5000, hindered secondary amines like Unilink 4200, Curene 442, Polacure 740, Ethacure 300, Lonzacure M-CDEA, Polyaspartics, 4,9 Dioxadodecan-1,12-diamine, and combinations thereof. In other embodiments, the amine is chosen from Lupragen® API-N-(3-Aminopropyl)imidazole, Lupragen® DMI-1,2-Dimethylimidazole, Lupragen® DMI-1,2-Dimethylimidazole, Lupragen® N 100-N,N-Dimethylcyclohexylamine, Lupragen® N 101-Dimethylethanolamine, Lupragen® N 103-N,N-Dimethylbenzylamine, Lupragen® N 104-N-Ethylmorpholine, Lupragen® N 105-N-Methylmorpholine, Lupragen® N 106-2,2'-Dimorpholinodiethylether, Lupragen® N 107-Dimethylaminoethoxyethanol, Lupragen® N 201-TEDA in DPG, Lupragen® N 202-TEDA in BDO, Lupragen® N 203-TEDA in MEG, Lupragen® N 204-N,N'-Dimethylpiperazine, Lupragen® N 205-Bis(2-dimethylaminoethyl)ether, Lupragen® N 206-Bis(2-dimethylaminoethyl)ether, Lupragen® N 301-Pentamethyldiethylenetriamine, Lupragen® N 301-Pentamethyldiethylenetriamine, Lupragen® N 400-Trimethylaminoethylethanolamine, Lupragen® N 500-Tetramethyl-1,6-hexandiamine, Lupragen® N 500-Tetramethyl-1,6-hexanediamine, Lupragen® N 600-S-Triazine, Lupragen® N 700-1,8-Diazabicyclo-5,4,0-undecene-7, Lupragen® NMI-N-Methylimidazole, and combinations thereof.

The isocyanate-reactive component used to form the new polyurethane article, or new polyurethane foam article, may also include one or more catalysts. The catalyst is typically present in the isocyanate-reactive component to catalyze the reaction between the isocyanate component (including the isocyanate-functional polymer component and the second isocyanate component) and the isocyanate-reactive component. That is, isocyanate-reactive component typically includes a "polyurethane catalyst" which catalyzes the reaction between an isocyanate-functional group of the isocyanate-functional polymer component and the second isocyanate component and the hydroxyl-functional group of the isocyanate reactive group, including a hydroxyl group from the polydiene polyol.

It is to be appreciated that the catalyst is typically not consumed in the exothermic reaction between the isocyanate component (including the isocyanate-functional polymer component and the second isocyanate component) and the isocyanate-reactive component. More specifically, the catalyst typically participates in, but is not consumed in, the exothermic reaction.

The catalyst may include any suitable catalyst or mixtures of catalysts known in the art, including many of those described above with respect to forming the isocyanate-terminated prepolymers. Examples of suitable catalysts include, but are not limited to, gelation catalysts, e.g., amine catalysts in dipropylene glycol; blowing catalysts, e.g., bis(dimethylaminoethyl)ether in dipropylene glycol; and metal catalysts, e.g., organo-tin compounds, organo-bismuth compounds, organo-lead compounds, etc.

This catalyst may be any in the art. In one embodiment, the isocyanate catalyst is an amine catalyst. In another embodiment, the isocyanate catalyst is an organometallic catalyst.

The isocyanate catalyst may be or include a tin catalyst. Suitable tin catalysts include, but are not limited to, tin(II) salts of organic carboxylic acids, e.g. tin(II) acetate, tin(II) octoate, tin(II) ethylhexanoate and tin(II) laurate. In one embodiment, the isocyanate catalyst is or includes dibutyltin dilaurate, which is a dialkyltin(IV) salt of an organic carboxylic acid. Specific examples of non-limiting isocyanate catalysts are commercially available from Air Products and Chemicals, Inc. of Allentown, PA, under the trademark DABCO®. The isocyanate catalyst can also include other dialkyltin(IV) salts of organic carboxylic acids, such as dibutyltin diacetate, dibutyltin maleate and dioctyltin diacetate.

Examples of other suitable but non-limiting isocyanate catalysts include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable but non-limiting isocyanate catalysts include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trademark POLYCAT®.

Yet further examples of other suitable but non-limiting isocyanate catalysts include dimethylaminoethanol, dimethylaminoethoxyethanol, triethylamine, N,N,N',N'-tetramethylethylenediamine, N,N-dimethylaminopropylamine, N,N,N',N',N''-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N''-pentamethyldiethylenetriamine, 1,2-dimethylimidazole, 3-(dimethylamino)propylimidazole, and combinations thereof.

In various embodiments, the isocyanate catalyst is commercially available from Air Products and Chemicals, Inc. under the trademark POLYCAT®. The isocyanate catalyst may include any combination of one or more of the aforementioned catalysts.

In still other embodiments, the catalyst is chosen from DABCO TMR, DABCO TMR-2, DABCO HE, DABCO 8154, PC CAT DBU TA 1, PC CAT Q1, Polycat SA-1, Polycat SA-102, salted forms, and/or combinations thereof.

In other embodiments, the catalyst is chosen from dibutyltin dilaurate, dibutyltin oxide (e.g. as a liquid solution in C8-C10 phthalate), dibutyltin dilaurylmercaptide, dibutyltin bis(2-ethylhexylthioglycolate), dimethyltin dilaurylmercaptide, diomethyltin dineodecanoate, dimethyltin dioleate, dimethyltin bis(2-ethylhexylthioglycoate), dioctyltin dilaurate, dibutyltin bis(2-ethylhexoate), stannous octoate, stannous oleate, dibutyltin dimaleate, dioctyltin dimaleate, dibutyitin maleate, dibutyltin mercaptopropionate, dibutyltin bis(isoodyithioglycolate), dibutyltin diacetate, dioctyltin oxide mixture, dioctyltin oxide, dibutyltin diisooctoate, dibutyltin dineodecanoate, dibutyltin carboxylate, dioctyitin carboxylate, and combinations thereof.

The isocyanate catalyst can be utilized in various amounts. For example, in various embodiments, the isocyanate catalyst is utilized in an amount of from 0.0001 to 10, from 0.0001 to 5, from 5 to 10, weight percent based on a total weight percent of reactants or the isocyanate or any other value or range of values therebetween. Typically, an amount of catalyst used depends on a temperature of the process. For example, at 150° F. (about 65.5° C.), 0.0001% may be utilized, while at room temperature 0.001 to 10%, such as 5-10%, such as 0.001 to 1%, may be utilized.

The isocyanate-reactive component can also include a "curing agent", i.e., a crosslinker that crosslinks the carbon-carbon double bonds of a polydiene polyol, if present. Examples of curing agents include, but are not limited to, organic peroxides, sulfur, and organic sulfur-containing compounds. Non-limiting examples of organic peroxides include dicumyl peroxide and t-butylperoxyisopropyl benzene. Non-limiting examples of organic sulfur-containing compounds include thiuram based vulcanization promoters such as tetramethylthiuram disulfide (TMTD), tetraethylthiuram disulfide (TETD), and dipentamethylenethiuram tetrasulfide (DPTT), 4,4'-dithiomorpholine.

The isocyanate-reactive component used in forming the new polyurethane article, or new polyurethane foam article, can also include an adhesion promoter. The adhesion promoter may be a silicon-containing adhesion promoter. Adhesion promoters are also commonly referred to in the art as coupling agents or binder agents.

The isocyanate-reactive component used in forming the new polyurethane article, or new polyurethane foam article, can also include a wetting agent. The wetting agent may be a surfactant. The wetting agent may include any suitable wetting agent or mixtures of wetting agents known in the art.

The isocyanate-reactive component used in forming the new polyurethane article, or new polyurethane foam article, may also include various additional additives. Suitable additives include, but are not limited to, anti-foaming agents, processing additives, plasticizers, chain terminators, surface-active agents, flame retardants, anti-oxidants, water scavengers, fumed silicas, dyes or pigments, ultraviolet light stabilizers, fillers, thixotropic agents, silicones, transition metals, and combinations thereof. The additive may be included in any amount as desired by those of skill in the art.

Referring back to method for forming the new polyurethane article, in any of the embodiments described above, the viscosity of one or more of the individual components used to form the second mixture, including the aforementioned isocyanate-functional polymer component, the second isocyanate component, and/or the isocyanate-reactive component, has a viscosity of from 5 to 10,000 centipoise, as measured in accordance with ASTM standard D2196. In this way, each of the components of the second mixture are sufficiently liquid to allow the components to mix and react to form the new polyurethane article or new polyurethane foam article.

The new polyurethane foam articles of the subject disclosure are formed by mixing and reacting the isocyanate-functional polymer component, the second isocyanate component and the isocyanate-reactive component in combination with any of the other optional components described above in the presence of a blowing agent. The blowing agent of the subject disclosure may be a physical blowing agent, a chemical blowing agent, or a combination of a physical blowing agent and chemical blowing agent.

The physical blowing agent, such as those described above with respect to the polyurethane foams that may be used as the recycled polyurethane article, is typically introduced to the second mixture in an amount of from about 0.125 to about 15 parts by weight, such as from 4 to 6 parts by weight, based on 100 parts by weight of the combined weight of the active hydrogen content present in the isocyanate-reactive component and the blowing agent.

The chemical blowing agent, such as those described above with respect to the polyurethane foams that may be used as the recycled polyurethane article, is typically introduced in an amount such that, after reaction, the resultant blowing agent comprises from about 0.125 to about 15 parts by weight, such as from 4 to 6 parts by weight, based on 100 parts by weight of the combined weight of the active hydrogen content present in the isocyanate-reactive component and the blowing agent.

The subject disclosure thus provides simple, efficient method for utilizing recycled polyurethane articles into new and useful materials, including new isocyanate-functional polymer components and polyurethane articles or polyurethane foam articles.

Moreover, in certain embodiments, and as illustrated in the Examples below, the new polyurethane articles, and the polyurethane foam articles, which are formed wherein the isocyanate-functional polymer component comprises from greater than 0 to less than about 100 weight percent of the total weight of sum of the isocyanate-functional polymer component and second isocyanate component, provide similar or enhanced physical properties in terms of core density, air flow, graves tear strength, tensile strength, elongation and heat aged tensile strength as compared to polyurethane articles formed from utilizing 100 weight percent of the second isocyanate component reacted with the first-isocyanate-reactive component at the same NCO/OH weight ratio.

EXAMPLES

The following Examples are meant to illustrate the subject disclosure and are not to be viewed in any way as limiting to the scope of the subject disclosure. In these Examples, the NCO content of the respective samples discussed below were each measured in accordance with the procedure outlined in ASTM D2572.

Example 1: Formation and Evaluation of Isocyanate-Functional Polymer Component In this Example, four separate experiments were performed for forming isocyanate-functional polymer components by reacting Lupranate® T-80 (an 80:20 blend of 2,4- and 2,6-toluene diisocyanate isomers having an NCO content of 39.296 weight percent) type 1 isocyanates (available from BASF Corporation of Florham Park, N.J.) with various recycled polyurethane foam articles that were first transformed to liquid form from a solid form and then reacted to form the liquid isocyanate-functional polymer component in accordance with the subject disclosure as described above.

Example 1A

Composition:

| | | |
|---|---:|---:|
| Lupranate ® T-80, type 1 | 76.21% | 480.00 g |
| SRU Foam (Semi Rigid Foam SH NFBA) | 23.79% | 149.80 g |
| | 100.00% | 629.80 g |

Procedure:

Charge Lupranate® T-80, type 1 in a 5 liter glass flask equipped with condenser. Add previously cut pieces of the SRU foam (1st portion—59.9 g). Turn heater on and heat the content of the flask to 155° C. Start agitation and wait until the foam is transformed to liquid form. Add the rest of the foam, wait until it also is also converted to liquid form, and stir the liquid contents at 155° C. for 1 hour. Cool the reaction mass to room temperature and keep it in a hood overnight. Next day start the agitation again and heat the mixture to 155° C. for 3 hours. Transfer material into glass container for analysis. The resultant isocyanate-functional component had an NCO content of 32.99 weight.

Example 1B

Composition:

| | | |
|---|---:|---:|
| Lupranate ® T-80, type 1 | 77.0% | 505.50 g |
| MCU Foam 1 (Cellasto ® Crumbs MHK6 (NDI)) | 25.0% | 168.50 g |
| | 100.00% | 674.00 g |

Procedure:

Charge Lupranate® T-80, type 1 and the MCU foam 1 in a 1 liter glass flask equipped with a condenser. Start agitation and heat the contents of the flask to 155° C. for 3 hours. Transfer the material into a glass container and hold overnight. Next day return the material to the 1 liter glass flask and heat the contents of the glass container to 155° C. while stirring for 3 hours. Transfer material into a glass container for analysis. The resultant isocyanate-functional component had an NCO content of 34.17 weight percent.

Example 1C

Composition:

| | | |
|---|---:|---:|
| Lupranate ® T-80, type 1 | 75.0% | 674.25 g |
| MCU Foam 2 (MH24 (NDI) - Cellasto ® Crumbs) | 25.0% | 24.75 g |
| | 100.00% | 899.00 g |

Procedure:

Charge Lupranate® T-80, type 1 and MCU Foam 2 in a 2 liter glass flask equipped with the condenser. Start agitation and heat the content of the flask to 155° C. for 3 hours and subsequently maintain the contents of the flask at 150° C. for 2 hours. Transfer material into 32 oz. glass container for analysis. The resultant isocyanate-functional component had an NCO content of 33.69 weight percent.

Example 1D

Composition:

| | | |
|---|---:|---:|
| Lupranate ® T-80, type 1 | 80.0% | 777.2 g |
| Flexible Foam Crumbs 300N | 20.0% | 194.30 g |
| | 100.00% | 971.50 g |

Procedure:

Charge Lupranate® T-80, type 1 and the flexible foam crumbs (300N, finely ground flexible foam commercially available from Scott Del Cushion LLC of Swanton, Ohio) in a 2 l glass flask equipped with a condenser. Start agitation and heat the content of the flask to 155° C. for 1 hour. Increase the temperature in the flask to 160° C. and hold for 7 hours and 15 minutes. Cool the contents of the flask and store overnight. The next day heat the contents of the flask to 160° C. for 8 hours and 15 minutes. Let the resultant product stay in a hood overnight at room temperature. The third day transfer the contents to a 32 oz. glass container for analysis. The resultant isocyanate-functional component had an NCO content of 32.26 weight percent.

Example 2: Formation and Evaluation of Flexible Polyurethane Foam Articles Including Varying Amounts of Isocyanate-Functional Polymer Component Example 2 provides flexible polyurethane foam articles (Examples 6, 8, 10, 12, 14, 16, 18, 20, 22, 23, 25, 27, 29, and 30) formed in accordance with the instant disclosure. More specifically, Example 2 illustrates the production of highly resistant (HR) molded foams which are formed in accordance with the instant disclosure. The Comparative Examples 2 and 4 are polyurethane foam articles (HR Molded foam article) not formed in accordance with the instant disclosure, which is included for comparative purposes. Comparative Example 4 provides the same Isocyanate Reactive Component Package as each of the flexible polyurethane foam article samples made in accordance with the subject disclosure, while Comparative Example 4 varies the ratio of Polyol 1 (a polyether polyol) and Polyol 2 (a graft polyol) to achieve harder polyurethane foam articles as is conventional in the art.

Referring now to Table 1, a series of new polyurethane articles including varying amounts of an isocyanate-functional polymer component formed in accordance with the subject disclosure (Examples 1B, 1C or 1D above), an additional isocyanate-reactive component (i.e., the Isocyanate Reactive Component Package) and an additional isocyanate (TDI) are described. The amount and type of each component used to form the Isocyanate Reactive Component Package is indicated in Table 1 below with all values in parts by weight, based on 100 parts by weight of total hydroxyl-functional polymer present in each isocyanate-reactive component, i.e., the parts by weight for each component are not normalized to 100 parts of the total weight of the isocyanate-reactive component. Table 1 also includes an isocyanate index (corresponding to the NCO:OH ratio) at which the Isocyanate Reactive Component Package and the isocyanate component are reacted to the Examples and Comparative Examples.

Each of components described in Table 1 were mixed with a drill press having a high sheer mixing blade attached thereto to form a reaction mixture. More specifically, each of components (introduced respectively at a temperature of about 75 degrees Fahrenheit) were mixed to achieve an isocyanate index of 100 (corresponding to an NCO:OH ratio of 1:1) and an a mix ratio of 435/185 (grams of the Isocyanate Reactive Component Package to grams of the combination of the isocyanate components (Examples 1B, 1C or 1D in combination with TDI).

In turn, the reaction mixture is deposited into a mold and reacts to form 15×15×0.4 inch blocks of polyurethane foam, each of which weighs about 500 grams. The samples were formed with a demold time of 5 minutes and a vent time of approximately 40 seconds. Once molded, the samples were cured for 24-48 hours. The samples were then cut into samples for use in various tests to determine the values of various comfort and support properties, i.e., physical properties, and flammability properties, the results of which are also included below in Table 2.

The samples are tested to determine a density at 25 degrees Celsius and 50% relative humidity in accordance with ASTM D3574, a 25% indentation force deflection (IFD), and a 65% IFD. The 25% IFD is defined as an amount of force in pounds required to indent a 50 in$^2$, round indenter foot into the sample a distance of 25% of the sample's thickness. Similarly, a 65% IFD is defined as the amount of force in pounds required to indent the indenter foot into the sample a distance of 65% of the sample's thickness.

The samples are also tested for tensile strength, tear strength, and elongation in accordance with ASTM D3574. Tensile strength, tear strength, and elongation properties describe the ability of the flexible polyurethane foam to withstand handling during manufacturing or assembly operations. Specifically, tensile strength is the force in lbs/in.sup.2 required to stretch the flexible polyurethane foam to a breaking point. Tear strength is the measure of the force required to continue a tear in the flexible polyurethane foam after a split or break has been started, and is expressed in lbs/in (ppi). Finally, elongation is a measure of the percent that the flexible polyurethane foam will stretch from an original length before breaking.

The resilience of the samples is measured in accordance with ASTM D3574 by dropping a steel ball from a reference height onto the samples and measuring a peak height of ball rebound. The peak height of ball rebound, expressed as a percentage of the reference height, is the resilience.

The samples are also evaluated for compression set in accordance with ASTM D3574. Compression set is a measure of permanent partial loss of original height of the flexible polyurethane foam after compression due to a bending or collapse of cellular structures within the flexible polyurethane foam. Compression set is measured by compressing the flexible polyurethane foam by 90%, i.e., to 10% of original thickness, and holding the flexible polyurethane foam under such compression at 70 degrees Celsius for 22 hours. Additionally, the flexible polyurethane foams also subject to humid aging for compression set, 50%. Humid aging is an accelerated aging test method under conditions of 122 degrees Fahrenheit for 22 hours at 100% relative humidity.

Further, the samples are measured for porosity according to the Frazier Air Flow/Air Flow tests of ASTM D3574 and D737. The Frazier air flow test measures the ease with which air passes through the flexible polyurethane foams. The air flow test consists clamping a sample over an open chamber and creating a specified constant air-pressure differential. The Frazier air-flow value is the rate of air flow, in cubic feet per minute per square foot, required to maintain the constant air-pressure differential. Said differently, the air flow value is the volume of air per second at standard temperature and pressure required to maintain a constant air-pressure differential of 125 Pa across a 2.75 diameter sample. The Air Flow, in cubic feet per minute is the air flow through the flexible polyurethane foam.

Furthermore, the samples are tested for hardness according to ASTM D3574 C J2, D3574-11, "Standard Test Methods for Flexible Cellular Materials—Slab, Bonded, and Molded Urethane Foams", test C—compression force deflection test after aging for 5 hours at 100% RH (Aging Test—steam autoclave testing) and aging at for 5 hours at 120 degrees Celsius (250 degrees Fahrenheit) (122.1.2 Procedure J2). Values are reported in % of original value retained.

TABLE 1

| Components | Comparative Ex. 2 | Comparative Ex. 4 | Ex. 6 | Ex. 8 | Ex. 10 | Ex. 12 |
| --- | --- | --- | --- | --- | --- | --- |
| Isocyanate-Reactive Component Package | | | | | | |
| Polyol 1[1] | 30 | 70 | 70 | 70 | 70 | 70 |
| Polyol 2[2] | 70 | 30 | 30 | 30 | 30 | 30 |

TABLE 1-continued

|  | | | | | |
|---|---|---|---|---|---|
| Crosslinking Agent A[3] | 1.6 | 1.6 | 1.6 | 1.6 | 1.6 | 1.6 |
| Catalyst A[4] | 0.35 | 0.35 | 0.35 | 0.35 | 0.35 | 0.35 |
| Catalyst B[5] | 0.08 | 0.08 | 0.08 | 0.08 | 0.08 | 0.08 |
| Surfactant A[6] | 1 | 1 | 1 | 1 | 1 | 1 |
| Water | 3.71 | 3.71 | 3.71 | 3.71 | 3.71 | 3.71 |
| Example 1B (grams) | | | 8.6 | 17.3 | 34.5 | 68.5 |
| TDI (grams) | 185 | 187 | 181.5 | 175 | 163.1 | 140.6 |
| Isocyanate-Reactive Component Weight (grams) | 435 | 433 | 430 | 427.7 | 422.4 | 410.9 |
| Molded Block Weight (grams) | 524 | 523 | 524 | 525 | 524 | 526 |

|  | Ex. 14 | Ex. 16 | Ex. 18 | Ex. 20 | Ex. 22 |
|---|---|---|---|---|---|
| Isocyanate-Reactive Component Package | | | | | |
| Polyol 1[1] | 70 | 70 | 70 | 70 | 70 |
| Polyol 2[2] | 30 | 30 | 30 | 30 | 30 |
| Crosslinking Agent A[3] | 1.6 | 1.6 | 1.6 | 1.6 | 1.6 |
| Catalyst A[4] | 0.35 | 0.35 | 0.35 | 0.35 | 0.35 |
| Catalyst B[5] | 0.08 | 0.08 | 0.08 | 0.08 | 0.08 |
| Surfactant A[6] | 1 | 1 | 1 | 1 | 1 |
| Water | 3.71 | 3.71 | 3.71 | 3.71 | 3.71 |
| Polyol 1[1] | | | | | |
| Example 1C (grams) | 8.6 | 17.3 | 34.4 | 68.5 | 135 |
| TDI (grams) | 181.5 | 175 | 164.2 | 140.6 | 96 |
| Isocyanate-Reactive Component Weight (grams) | 430 | 427.7 | 421.4 | 410.0 | 389 |
| Molded Block Weight (grams) | 525 | 524 | 523 | 524 | 527 |

|  | Ex. 23 | Ex. 25 | Ex. 27 | Ex. 29 | Ex. 30 |
|---|---|---|---|---|---|
| Isocyanate-Reactive Component Package | | | | | |
| Polyol 1[1] | 70 | 70 | 70 | 70 | 70 |
| Polyol 2[2] | 30 | 30 | 30 | 30 | 30 |
| Crosslinking Agent A[3] | 1.6 | 1.6 | 1.6 | 1.6 | 1.6 |
| Catalyst A[4] | 0.35 | 0.35 | 0.35 | 0.35 | 0.35 |
| Catalyst B[5] | 0.08 | 0.08 | 0.08 | 0.08 | 0.08 |
| Surfactant A[6] | 1 | 1 | 1 | 1 | 1 |
| Water | 3.71 | 3.71 | 3.71 | 3.71 | 3.71 |
| Example 1D (grams) | 8.6 | 17.3 | 34.4 | 68.3 | 135 |
| TDI (grams) | 181.5 | 175 | 164.2 | 141.8 | 97 |
| Isocyanate-Reactive Component Weight (grams) | 430 | 427.7 | 421.4 | 409.9 | 388 |
| weight(grams) | 524 | 523 | 523 | 524 | 526 |

[1]Polyol 1 is a primary hydroxyl terminated polyether polyol having a hydroxyl number of from 20 to 40 mg KOH/g.
[2]Polyol 2 is a graft polyester triol having approximately 43% acrylonitrile/styrene copolymer and having a hydroxyl number of from 15 to 35 mg KOH/g.
[3]Crosslinking Agent A is diethanolamine.
[4]Catalyst A is an amine catalyst.
[5]Catalyst B is a solution of 70% by weight bis-(2dimethylaminoethyl)ether and 30% by weight dipropylene glycol
[6]Surfactant A is silicone glycol copolymer.

TABLE 2

| TEST RESULTS | | | | | | |
|---|---|---|---|---|---|---|
| Force to crush 2 block average | Comp. Ex. 2 AFTC | Comp. Ex. 4 AFTC | Ex. 6 AFTC | Ex. 8 AFTC | Ex. 10 AFTC | Ex. 12 AFTC |
| 1 | 335 | 386 | 344 | 352 | 346 | 313 |
| 2 | 146 | 257 | 206 | 211 | 212 | 184 |
| 3 | 95 | 171 | 123 | 132 | 134 | 112 |
| 4 | 73 | 117 | 82 | 89 | 91 | 74 |
| 5 | 66 | 86 | 58 | 68 | 66 | 55 |
| 6 | 61 | 68 | 48 | 54 | 54 | 45 |
| 7 | 58 | 55 | 42 | 45 | 44 | 38 |
| 8 | 57 | 47 | 34 | 40 | 39 | 33 |

TABLE 2-continued

TEST RESULTS

| | | | | | | |
|---|---|---|---|---|---|---|
| 9 | 59 | 41 | 31 | 37 | 35 | 28 |
| 10 | 57 | 36 | 29 | 35 | 32 | 26 |
| Physical Properties | average | average | average | average | average | average |
| Density block, pcf | 2.2 | 2.2 | 2.2 | 2.2 | 2.2 | 2.2 |
| Air flow Frazier cfm/ft$^2$ | 66 | 103 | 75 | 71 | 117 | 105 |
| Tear Graves, pi | 4.6 | 3.4 | 3.4 | 3.7 | 3.4 | 3.3 |
| Tensile, psi | 28 | 19 | 18 | 20 | 20 | 20 |
| Elongation, % | 75 | 89 | 87 | 90 | 86 | 79 |
| IFD, lbs | | | | | | |
| 25% | 53 | 30 | 29 | 30 | 31 | 35 |
| 65% | 160 | 83 | 84 | 85 | 87 | 96 |
| 25% return | 33 | 23 | 22 | 23 | 23 | 26 |
| Resilience, % | 36 | 52 | 52 | 52 | 52 | 51 |
| Compression Sets, % loss | | | | | | |
| 50% Ambient | 68 | 24 | 36 | 35 | 29 | 32 |
| Humid aged Wet | 79 | 43 | 42 | 43 | 44 | 50 |
| 90% Ambient | 53 | 30 | 29 | 30 | 31 | 35 |

| | Ex. 14 | Ex. 16 | Ex. 18 | Ex. 20 | Ex. 22 |
|---|---|---|---|---|---|
| Force to crush 2 block average | AFTC | AFTC | AFTC | AFTC | AFTC |
| 1 | 350 | 346 | 339 | 322 | 243 |
| 2 | 205 | 208 | 205 | 193 | 107 |
| 3 | 120 | 125 | 124 | 117 | 66 |
| 4 | 80 | 84 | 85 | 78 | 50 |
| 5 | 59 | 61 | 61 | 59 | 39 |
| 6 | 49 | 49 | 50 | 48 | 36 |
| 7 | 42 | 44 | 44 | 40 | 33 |
| 8 | 37 | 37 | 36 | 33 | 28 |
| 9 | 34 | 34 | 34 | 31 | 25 |
| 10 | 33 | 33 | 31 | 26 | 25 |
| Physical Properties | average | average | average | average | average |
| Density block, pcf | 2.2 | 2.2 | 2.2 | 2.2 | 2.2 |
| Air flow Frazier cfm/ft$^2$ | 91 | 87 | 111 | 125 | 125 |
| Tear Graves, pi | 3.5 | 3.5 | 3.1 | 2.9 | 2.9 |
| Tensile, psi | 19 | 19 | 19 | 16 | 16 |
| Elongation, % | 89 | 88 | 86 | 73 | 73 |
| IFD, lbs | | | | | |
| 25% | 29 | 30 | 31 | 33 | 33 |
| 65% | 84 | 85 | 87 | 89 | 89 |
| 25% return | 22 | 23 | 23 | 24 | 24 |
| Resilience, % | 52 | 51 | 52 | 51 | 51 |
| Compression Sets, % loss | | | | | |
| 50% Ambient | 41 | 43 | 46 | 17 | 17 |
| Humid aged Wet | 42 | 43 | 45 | 47 | 47 |
| 90% Ambient | 29 | 30 | 31 | 33 | 33 |

| | Ex 23 | Ex 25 | Ex 27 | Ex 29 | Ex 30 |
|---|---|---|---|---|---|
| Force to crush 2 block average | AFTC | AFTC | AFTC | AFTC | FTC |
| 1 | 348 | 332 | 302 | 233 | 72 |
| 2 | 213 | 188 | 167 | 118 | 30 |
| 3 | 132 | 117 | 103 | 74 | 26 |
| 4 | 90 | 79 | 71 | 53 | 24 |
| 5 | 66 | 60 | 57 | 44 | 23 |
| 6 | 54 | 50 | 45 | 39 | 22 |
| 7 | 45 | 43 | 40 | 34 | 25 |
| 8 | 42 | 39 | 36 | 34 | 25 |
| 9 | 38 | 34 | 32 | 31 | 24 |
| 10 | 33 | 32 | 30 | 30 | 26 |
| Physical Properties | average | average | average | average | average |
| Density block, pcf | 2.2 | 2.2 | 2.2 | 2.2 | 2.2 |
| Air flow Frazier cfm/ft2 | 75 | 84 | 57 | 92 | 90 |
| Tear Graves, pi | 3.5 | 3.1 | 3.3 | 3.2 | 3.2 |
| Tensile, psi | 18 | 19 | 18 | 18 | 20 |
| Elongation,% | 87 | 90 | 84 | 73 | 64 |
| Heat aged Tensile, psi | 22 | 22 | 20 | 18 | 14 |

TABLE 2-continued

TEST RESULTS

| IFD, lbs | | | | | |
|---|---|---|---|---|---|
| 25% | 32 | 33 | 36 | 42 | 39 |
| 65% | 88 | 91 | 98 | 113 | 127 |
| 25% return | 24 | 24 | 26 | 28 | 23 |
| Resilience, % | 51 | 49 | 46 | 43 | 40 |
| Compression Sets, % loss | | | | | |
| 50% Ambient | 19 | 30 | 19 | 23 | 57 |
| Humid aged Wet | 45 | 47 | 51 | 60 | 61 |
| 90% Ambient | 32 | 33 | 36 | 42 | 39 |

The results presented in the above tables confirm that the polyurethane foam articles incorporating the isocyanate-functional polymer component of the Examples could be produced in substantially the same manner as in its absence (see Comparative Example 4), and the resultant foams had similar physical properties in terms of density, air flow Frazier, Grave tear strength, elongation, tensile strength, IFD, resilience, and compression. The results also show that the hardness of the polyurethane foam articles of the Examples increased with a sequential increase in the amount of the isocyanate-functional polymer component as compared with Comparative Example 4.

Obviously, many modifications and variations of the subject disclosure are possible in light of the above teachings. The subject disclosure may be practiced otherwise than as specifically described within the scope of the appended claims.

The invention claimed is:

1. A method of forming an isocyanate-functional polymer component, the method comprising:
   forming a first mixture by mixing a recycled polyurethane article in solid form and a first isocyanate component having isocyanate-functional groups;
   heating the first mixture to a temperature sufficient to transform the recycled polyurethane article in solid form to a recycled polyurethane article in liquid form; and
   reacting the recycled polyurethane article in the liquid form with the first isocyanate component at the temperature for a time sufficient to form the isocyanate-functional polymer component,
   wherein the isocyanate-functional group content (NCO content) of the isocyanate-functional polymer component is greater than zero and is less than an NCO content of the first isocyanate component, wherein the NCO content of the Isocyanate-functional polymer component and the NCO content of the first isocyanate component are each determined according to ASTM D2572.

2. The method according to claim 1, wherein the NCO content of the isocyanate-functional polymer component is from 2 to 98 weight percent less than the NCO content of the first isocyanate component.

3. The method according to claim 2, wherein the NCO content of the isocyanate-functional polymer component ranges from 1 to 47 weight percent based on the total weight of the isocyanate-functional polymer component.

4. The method according to claim 1, wherein the provided recycled polyurethane article is in a non-comminuted solid form, and wherein the method further comprises the step of pulvering the recycled polyurethane article to form a comminuted recycled polyurethane article in solid form prior to the step of mixing the comminuted recycled polyurethane article and a first isocyanate component having isocyanate-functional groups.

5. The method according to claim 1, wherein the temperature ranges from 50 to 300 degrees Celsius.

6. The method according to claim 1, wherein the temperature ranges from 50 to 300 degrees Celsius and the time ranges from 1 to 48 hours.

7. The method according to claim 1, wherein the isocyanate-functional polymer component has a viscosity ranging from 5 to 10,000 centipoise at 25 degrees Celsius as measured in accordance with ASTM D2196.

8. The method according to claim 1, wherein the recycled polyurethane article comprises a recycled polyurethane foam article.

9. The method according to claim 1, wherein the recycled polyurethane article comprises a recycled flexible polyurethane foam article.

10. The method according to claim 1, wherein the recycled polyurethane article comprises a recycled rigid polyurethane foam article.

11. The method according to claim 1, wherein the recycled polyurethane article comprises a recycled TPU article.

* * * * *